(12) United States Patent
Madhuvanthi Janarthanam

(10) Patent No.: US 12,710,985 B2
(45) Date of Patent: Aug. 18, 2026

(54) COUPLED COMPUTE AND STORAGE RESOURCE AUTOSCALING

(71) Applicant: NetApp Inc., San Jose, CA (US)

(72) Inventor: Madhuvanthi Janarthanam, Erie, CO (US)

(73) Assignee: NetApp, Inc., San Jose, CA (US)

( * ) Notice: Subject to any disclaimer, the term of this patent is extended or adjusted under 35 U.S.C. 154(b) by 884 days.

(21) Appl. No.: 17/956,051

(22) Filed: Sep. 29, 2022

(65) Prior Publication Data

US 2024/0111582 A1 Apr. 4, 2024

(51) Int. Cl.
*G06F 9/50* (2006.01)

(52) U.S. Cl.
CPC .................................. *G06F 9/5016* (2013.01)

(58) Field of Classification Search
None
See application file for complete search history.

(56) References Cited

U.S. PATENT DOCUMENTS 10,476,949 B2 11/2019 Marchetti et al.
10,761,875 B1 * 9/2020 Burgin .................... G06F 9/485
11,030,009 B2 6/2021 Gonzalez et al.
11,194,483 B1 * 12/2021 Dontu ..................... G06F 3/067
2013/0086270 A1 * 4/2013 Nishikawa ............ G06F 3/0631 709/226
2016/0335166 A1 * 11/2016 George ............... G06F 11/3006
2018/0024964 A1 * 1/2018 Mao .................... H04L 67/1097 711/173
2018/0316759 A1 * 11/2018 Shen .................. H04L 67/1097
2019/0349357 A1 * 11/2019 Shukla .................... H04L 63/20
2022/0237069 A1 * 7/2022 Freeman ............. G06F 11/3409
2023/0050796 A1 2/2023 Ghergu et al.
2023/0185619 A1 * 6/2023 Manley ............... G06F 11/3419 718/1

(Continued)

OTHER PUBLICATIONS

Chu, Qiao, Lin Cui, and Yuxiang Zhang. "Joint computing and storage resource allocation based on stable matching in data centers." In 2017 IEEE 3rd international conference on big data security on cloud (bigdatasecurity), pp. 207-212. IEEE, 2017. (Year: 2017).*

(Continued)

*Primary Examiner* — Frank D Mills
(74) *Attorney, Agent, or Firm* — Cooper Legal Group, LLC

(57) ABSTRACT

Techniques are provided for coupled compute and storage resource autoscaling. Applications may be hosted within an application hosting environment (e.g., containerized applications hosted within Kubernetes) that allocations certain amounts of compute resources (e.g., processor and memory resources) to the applications for execution. The applications may store data within persistent of a backend storage platform separate from the application hosting environment. An autoscaler monitors the health of storage resources allocated to an application during deployment and runtime of the application so that issues with the storage resources can be preemptively identified and resolved for non-disruptive operation of the application. The autoscaler scales both the compute resources and the storage resources assigned to the application so that the application can continue operation in a non-disruptive manner.

20 Claims, 14 Drawing Sheets

(56) References Cited

U.S. PATENT DOCUMENTS

2023/0224362 A1* 7/2023 Yamauchi ........... H04L 67/1008 709/224

OTHER PUBLICATIONS

"Allocatable Memory and CPU in Kubernetes Nodes", May 2020, Daniele Polencic, Learni8s, reprinted from the Internet at: https://learnk8s.io/allocatable-resources, 20 pgs.
"Using EBS with Auto Scaling Groups", May 2017, Portwarx, Amazon Web Services, reprinted from the Internet at: https://portworx.com/wp-content/uploads/2017/05/asg-slides.pdf, 31 pgs.
"Application Data Protection, Mobility and Storage for Cloud Native Applications", 2022, Cloud Central, Astra by NetApp—Astra Family, reprinted from the Internet at: https://cloud.netapp.com/astra, 9 pgs.
"Astra Control Service Documentation", Aug. 2022, NetApp, Astra Control Service, reprinted from the Internet at: https://docs.netapp.com/us-en/astra-control-service/, 114 pgs.
"Astra Trident 22.07 Documentation", Aug. 2022, Astra Trident, NetApp, reprinted from the Internet at: https://docs.netapp.com/us-en/trident/?q=macos, 283 pgs.
"AWS Auto Scaling", Jan. 2018, Jeff Barr, Application Scaling to Optimize Performance and Costs, reprinted from the Internet at: https://aws.amazon.com/autoscaling/, 7 pgs.
"Containerization", Jun. 2021, Sai Vennam, IBM Cloud Education, reprinted from the Internet at: https://www.ibm.com/cloud/learn/containerization, 14 pgs.
"Get Started", Jul. 2022, NetApp, Astra Data Store, reprinted from the Internet at: https://docs.netapp.com/us-en/astra-data-store/pdfs/sidebar/Get_started.pdf, 41 pgs.
"Google Kubernetes Engine: Ultimate Quick Start Guide", Jun. 2021, Yifat Perry, Cloud Central, Kubernetes Storage, reprinted from the Internet at: https://cloud.netapp.com/blog/gcp-cvo-blg-google-kubernetes-engine-ultimate-quick-start-guide, 9 pgs.
"Health Checks for Auto Scaling Instances", 2022, AWS Documentation, Amacon EC2 Auto Scaling, User Guide, reprinted from the Internet at: https://docs.aws.amazon.com/autoscaling/ec2/userguide/ec2-auto-scaling-health-checks.html, 10 pgs.
"Horizontal vs. Vertical Scaling in the Cloud", Jul. 2021, CloudCheckr now part of Spot by NetApp, Blog, Automation, reprinted from the Internet at: https://cloudcheckr.com/cloud-automation/horizontal-vertical-cloud-scaling/#:~:text=Horizontal%20scaling%20in%20cloud%20computing,with%20a%20more%20powerful%20server, 12 pgs.
"Using AWS Auto-Scaling Groups with Stateful Docker Containers", May 2017, Portworx, Amazon Web Services, reprinted from the Internet at: https://portworx.com/blog/auto-scaling-groups-ebs-docker/, 12 pgs.
"Kubernetes 101: Pods, Nodes, Containers, and Clusters", Jan. 2018, Daniel Sanche, Published in Google Cloud—Community, reprinted from the Internet at: https://medium.com/google-cloud/kubernetes-101-pods-nodes-containers-and-clusters-c1509e409e16, 9 pgs.
"Production-Grade Container Orchestration", 2022, Learn Kubernetes Basics, reprinted from the Internet at: https://kubernetes.io/, 6 pgs.
"Resource Management for Pods and Containers", Aug. 2022, Kubernetes Documentation, reprinted from the Internet at: https://kubernetes.io/docs/concepts/configuration/manage-resources-containers/, 12 pgs.
"Load Balancing and Scaling", Oct. 2022, Compute Engine Documentation, Google Cloud, reprinted from the Internet at: https://cloud.google.com/compute/docs/load-balancing-and-autoscaling, 3 pgs.
ONTAP 9 Documentation, Aug. 2022, ONTAP 9, NetApp, reprinted from the Internet at: https://docs.netapp.com/us-en/ontap/concepts/cluster-storage-concept.html, 215 pgs.
"Node Resource Allocation", Date not available, kOps, Kubernetes Operations, reprinted from the Internet at: https://kops.sigs.k8s.io/node_resource_handling/, 3 pgs.
"Stateful Apps on Kubernetes get a Big Boost with Astra Data Store", Oct. 2021, Arindam Banerjee, Cloud Central, reprinted from the Internet at: https://cloud.netapp.com/blog/astra-blg-stateful-apps-on-kubernetes-get-a-big-boost-with-astra-data-store, 4 pgs.
"The Key Pillars of the Astra Data Store Architecture", Apr. 2022, Cloud Central, reprinted from the Internet at: https://cloud.netapp.com/blog/astra-blg-kubernetes-applications-get-an-enterprise-grade-platform-with-astra-data-store, 5 pgs.
"What's the Difference Between a Pod, a Cluster, and a Container?" Sep. 2020, Kevin Casey, The Enterprisers Project, reprinted from the Internet at: https://enterprisersproject.com/article/2020/9/pod-cluster-container-what-is-difference#:~:text=%E2%80%9CA%20container%20runs%20logically%20in,tight%20logical%20borders%20called%20namespaces.%E2%80%9D, 6 pgs.
"The Power of Separating Clod Compute and Cloud Storage", 2022, Teradata VantageCloud, Unlock Data, Activte Analytics, Accelerate Value, reprinted from the Internet at: https://www.teradata.com/Trends/Cloud/The-Power-of-Separating-Cloud-Compute-and-Cloud-Storage, 11 pgs.
Understanding Kubernetes Node Resource Allocation, Sep. 2021, William Denniss, Powered by WordPress, reprinted from the Internet at: https://wdenniss.com/understanding-kubernetes-node-resource-allocation, 7 pgs.
Taherizadeh, et al.; Dynamic Multi-level Auto-scaling Rules for Containerized Applications; The Computer Journal, vol. 62, Issue 2, 2018; pp. 174-197, https://doi.org/10.1093/comjnl/bxy043; 24 Pgs.
Narayana, et al.; Application deployment using containers with auto-scaling for microservices in cloud environment; vol. 160; Jun. 15, 2020; 8 Pgs.
Vighnesh Sachidananda, et al.; Collective Autoscaling for Cloud Microservices; 2021; 39 Pgs.
Daniele Polencic; Allocatable memory and CPU in Kubernetes Nodes; May 2020; 20 Pgs.
Portworx; Amazon Web Services; Using EBS with Auto Scaling Groups; How to use the immense power of AWS Auto-Scaling Groups for a stateful Docker application; 31 Pgs.
Astra by NetApp—Astra Family; Application data protection, mobility andstorage for cloud native applications; 9 Pgs.
NetApp; Astra Control Service documentation; Aug. 10, 2022; 114 Pgs.
NetApp; Astra Trident 22.07 documentation; Aug. 12, 2022; 283 Pgs.
AWS Auto Scaling; https://aws.amazon.com/autoscaling/; 7 Pgs.
IBM Cloud Education; Containerization; Jun. 23, 2021; 14 Pgs.
NetApp; Get started; Astra Data Store; Jul. 25, 2022; 41 Pgs.
Netapp.com; Google Kubernetes Engine: Ultimate QuickStart Guide; Kubernetes Storage; What is Google Kubernetes Engine (GKE)?; Jul. 10, 2021; 9 Pgs.
Amazon EC2 Auto Scaling; Health checks for Auto Scaling instances; https://docs.aws.amazon.com/autoscaling/ec2/userguide/ec2-auto-scaling-health-checks.html; 10 Pgs.
CloudCheckr; Horizontal vs. Vertical Scaling in the Cloud; Jul. 8, 2021; 12 Pgs.
Portworx; Using AWS Auto-Scaling Groups with Stateful Docker Containers; May 22, 2017; 12 Pgs.
Daniel Sanche; Kubernetes 101: Pods, Nodes, Containers, and Clusters; Jan. 2, 2018; 9 Pgs.
Kubernetes; Production-Grade Container Orchestration; 6 Pgs.
Load balancing and scaling | Compute Engine Documentation | Google Cloud; Load balancing and scaling; 3 Pgs.
Node Resource Allocation—kOps—Kubernetes Operations; Node Resource Allocation; Node Resource Handling in Kubernetes; 3 Pgs.
NetApp; ONTAP 9 Documentation; ONTAP 9; Aug. 18, 2022; https://docs.netapp.com/us-en/ontap/index.html; 2712 Pgs.
Resource Management for Pods andContainers; Resource Management for Pods and Containers | Kubernetes; 12 Pgs.
Cloud Central; The story of stateful applications on Kubernetes; Stateful apps on Kubernetes get a big boost with Astra Data Store; Oct. 12, 2021; 4 Pgs.

(56) References Cited

OTHER PUBLICATIONS

Cloud Central; The key pillars of the Astra Data Store architecture; Kubernetes applications get an enterprise-grade data platform with Astra Data Store; Apr. 13, 2022; 5 Pgs.
Teradata VantageCloud; The Power of Separating CloudCompute and Cloud Storage; 11 Pgs.
William Denniss; Understanding Kubernetes Node Resource Allocation; 7 Pgs.
Kevin Casey; The Enterprisers Project; What's the difference between a pod, a cluster, and a container? 6 Pgs.

* cited by examiner

COUPLED COMPUTE AND STORAGE RESOURCE AUTOSCALING

TECHNICAL FIELD

Various embodiments of the present technology relate to coupled compute and storage resource autoscaling. More specifically, some embodiments relate to an autoscaler for coupled auto scaling of compute resources and storage resources for containerized applications.

BACKGROUND

Applications have historically been built to run on a single platform. An application may be hosted on a single device (e.g., an on-premises server, a cloud-based server, a client device, etc.), and the application may utilize memory, storage, and processor resources of that device. However, building and deploying these types of applications is no longer desirable in many instances because modern applications often need to efficiently and securely distribute data (potentially across multiple platforms) and scale based upon demand. There are many options for developing scalable, modern applications to distribute data. Examples include, but are not limited to, virtual machines, microservices, and containers. The choice often depends on a variety of factors, such as the type of workload, available resources, the need for automated scaling, the need for data distribution, execution preferences, data redundancy and protection requirements, etc.

When developers select a containerized approach for creating scalable and/or distributed applications, portions of an application may be packaged into containers using container images. Each container may comprise software code, binaries, system libraries, dependencies, system tools, and/or any other components or settings needed to execute the application. In this way, the container is a self-contained execution enclosure for executing that portion of the application. Management of a container (e.g., scaling, deployment, upgrading, health monitoring, etc.) is often automated by a container orchestration platform (e.g., Kubernetes).

The container orchestration platform can deploy containers on nodes (e.g., a virtual machine, physical hardware, etc.) that have allocated compute resources (e.g., processor, memory, etc.) for executing applications hosted within the containers. Applications (or processes) hosted within multiple containers may interact with one another and cooperate together. In some embodiments, a storage application within a container may access other applications within other containers to manage data of the storage application. Container orchestration platforms often offer the ability to support these cooperating applications (or processes) as a grouping (e.g., in Kubernetes this is referred to as a pod). This grouping (e.g., a pod) can support multiple containers and form a cohesive unit of service for the applications (or services) hosted within the containers.

While an application executing within a container of the container orchestration platform is allocated compute resources from a compute region (e.g., a computing environment with designated compute resources), the application may store data within storage resources (e.g., persistent storage) allocated to the application. The storage resources may be hosted within a separate storage region (e.g., a computing environment with designated storage resources) from the compute region. The storage resources may be hosted by a backend storage platform of the storage region. The backend storage platform may be a cloud storage environment. The compute region and the storage region are two separate environments that are managed separately from one another.

DESCRIPTION OF THE DRAWINGS

Embodiments of the present technology will be described and explained through the use of the accompanying drawings in which.

Figure 1A:
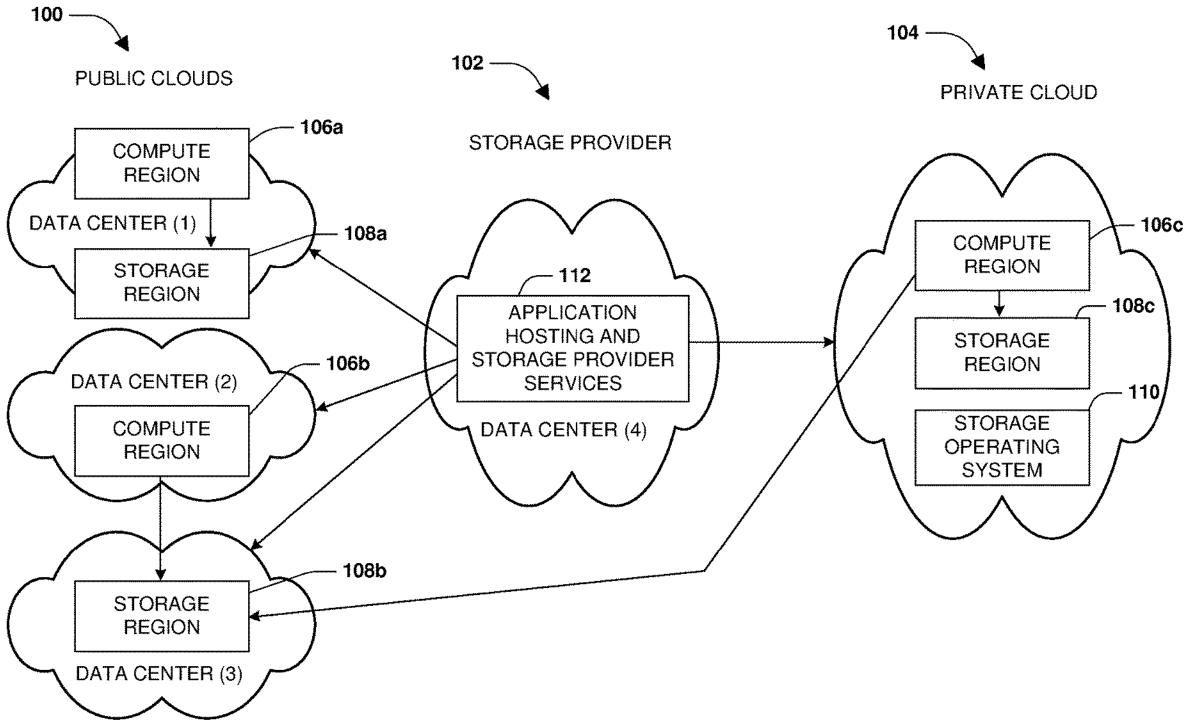
FIG. 1A is a block diagram illustrating an example of cloud computing environments used to host various types of services, in accordance with an embodiment of the present technology.

The drawings have not necessarily been drawn to scale. Similarly, some components and/or operations may be separated into different blocks or combined into a single block for the purposes of discussion of some embodiments of the present technology. Moreover, while the present technology is amenable to various modifications and alternative forms, specific embodiments have been shown by way of example in the drawings and are described in detail below. The intention, however, is not to limit the present technology to the particular embodiments described. On the contrary, the present technology is intended to cover all modifications, equivalents, and alternatives falling within the scope of the present technology as defined by the appended claims.

DETAILED DESCRIPTION

Various embodiments of the present technology relate to coupled compute and storage resource autoscaling. Many applications are now developed as containerized applications that run in containers managed by a container orchestration platform (e.g., Kubernetes). Running applications through containers provides scalability where any number of instances of an application can be run on-demand through containers. The number of containers can be scaled up or down based upon current demand for the application. If there is a larger backup task to be performed, then numerous instances of a backup application can be created and hosted on-demand within containers for performing the backup task.

An instance of an application hosted within a container can also be scaled by allocating more resources to the container for executing the application. If an instance of the backup application is performing a processor intensive operation as part of the backup task, then a container hosting the instance of the backup application can be assigned additional processor resources. In this way, the container orchestration platform provides horizontal and vertical scaling for applications. The container orchestration platform can be implemented within a compute region (e.g., a data center, a cloud computing environment, a server, a private or public cloud, an on-premise device, etc.), which may have large scale compute resource availability for hosting the containers.

When a containerized application is deployed within a container, the container is assigned a certain amount of compute resources from the compute region for executing the application (e.g., processor and memory resources of a cloud computing environment hosting the container orchestration platform). The containerized application consumes the compute resources for executing various tasks and workloads. Some tasks may involve longer term persistent data storage than what the compute resources (memory) provide. Accordingly, the containerized application may be assigned storage resources from a backend storage platform of a storage region different than the compute region. The storage region may provide long term persistent storage (e.g., hard disk drives, solid state drives, or other persistent storage media). In this way, the containerized application can store snapshots, backup data, restore backup data, and/or perform other tasks using the storage resources of the backend storage platform. The storage region is different than the compute region in that the regions may be hosted within different types of computing environments, and may utilize different communication protocols (e.g., the storage region may utilize representational state transfer (REST) application programming interfaces (APIs), while the compute region utilizes Kubernetes communication protocols), different APIs, command and functions, semantics, etc. Thus, the compute region and the storage region are separately managed and orchestrated, and may be maintained by different service providers.

Because the compute region and storage regions are separately managed and orchestrated, misalignment between storage resources and compute resources assigned from the different regions to an application can occur. The misalignment may correspond to where the compute region allocates a certain amount of compute resources to perform a task, but the storage region has not or cannot allocate a corresponding (aligned) amount of storage resources for completing the task. In this situation, the compute resources are wasted because the application cannot make forward progress in completing the task because there is not an adequate amount of allocated storage resources for performing the task. This misalignment can occur due to network connectivity issues from the application to the storage region, failure of storage resources allocated to the application, a situation where the storage region has not been instructed or has not yet processed an instruction to allocate the necessary storage resources, etc. If the storage resources assigned to the application are unavailable or non-operational (e.g., the backend storage platform is unreachable, a storage device has failed or has degraded health, etc.), then tasks being performed by the containerized application will fail. If the containerized application was performing a backup operation that fails, then data not yet backed up could be susceptible to data loss because the backup operation would be unable to create a backup within the storage resources. If the containerized application was performing a restore operation that fails, then a client will have prolonged downtime where the client cannot access data that was being restored by the restore operation. In this way, failures or other issues associated with the backend storage platform and/or the storage resources assigned to the application can result in application failures, prolonged periods where clients cannot access client data, and/or other task failures or data loss susceptibility.

Because the backend storage platform and the container orchestration platform are separate platforms that may be hosted on different hardware and/or could be operated by different service providers, detecting the failure of the storage resources assigned to the containerized application is a time-consuming manual process. Initially, a task being performed by the containerized application may fail. The containerized application may retry the task one or more times. At a subsequent point in time, the containerized application may generate a failure report that the task failed. A user must evaluate the failure report and perform various manual troubleshooting tasks to see why the task failed (e.g., is there a software bug, did the application run out of necessary compute resources, did the container orchestration platform have a failure, did the application fail, was there a network connectivity error, did the storage platform fail, is there a hardware or software failure, etc.). This can result in hours of downtime where clients cannot access client data and/or the containerized application cannot perform tasks assigned to the containerized application.

The techniques provided herein implement computer automated monitoring functionality that proactively monitors the health of the storage resources assigned to a containerized application during deployment and runtime to ensure that there is minimal disruption to the containerized application from backend storage platform side errors. Previously, compute scaling would be performed by the container orchestration platform separate from storage scaling performed by the backend storage platform. Instead, the computer automated monitoring functionality performs coupled compute and storage autoscaling where both compute and storage are scaled in a tightly coupled manner by monitoring and adjusting both compute and storage resource allocations in real-time during deployment and/or runtime of applications. Tightly coupled compute and storage autoscaling ensures that compute and storage resource allocations are aligned. That is, if compute resources are to be allocated for performing a task, then storage resources are also allocated to ensure that there is an adequate amount of storage for performing the task.

When compute resources are to be allocated to the containerized application during deployment or runtime when a task is to be performed, the operational health and accessibility of storage resources to allocate to the containerized application is determined. In this way, the compute and storage resources are allocated together to ensure that there is operational storage available for the containerized application to utilize once the compute resources are allocated and used to perform the task. Because the health of the storage resources is being proactively monitored during deployment and runtime, the coupled compute and storage autoscaling can be performed quickly to identify and allocate new healthy storage resources (e.g., within seconds of detecting a storage issue). By providing tightly coupled compute and storage autoscaling, vertical and horizontal scaling of compute and storage is provided in a manner that ensures that the compute resources being allocated to the containerized application will have access to healthy and operational storage. If the coupled compute and storage autoscaling determines that storage resources that will be used by the compute resources being allocated to the containerized application are not operational, then other operational storage resources are identified and allocated with the compute resources to the containerized application.

In some embodiments, a coupled compute and storage autoscaling operation can be performed during deployment of the containerized application to automatically scale compute (e.g., a physical host, a virtual machine, memory, CPU, etc.) and scale storage on an as needed basis for scalability and performance. The coupled compute and storage autoscaling operation can automatically monitor the health of storage resources assigned to the containerized application and the state of the backend storage platform. The state may correspond to a warning state (e.g., a storage device has degraded performance), an error state (e.g., a storage device has failed), a version compatibility mismatch between a version of the container orchestration platform and a version of the backend storage platform which can result in incompatibilities, etc.

Based upon the state, a self-healing operation can be performed to automatically repair or address any issues with the storage resources assigned to the containerized application (e.g., functionality within the backend storage platform may be invoked to perform the self-healing operation). If the self-healing is unsuccessfully a threshold number of times (e.g., the backend storage platform is not able to repair the storage resources allocated to the containerized application within three, five, or twenty attempts), then autoscaling is performed to automatically add healthy storage resources for the containerized application so that compute resources being assigned to the containerized application have access to healthy storage resources. This helps ensure that the application using the backend storage platform does not experience interruptions and/or failures. In this way, the coupled compute and storage autoscaling operation aids in automatically discovering available and operational storage from the backend storage platform (e.g., storage available across multiple cloud storage regions, across different cloud storage providers, etc.) to allocate with the allocation of compute resources to the containerized application.

The coupled compute and storage autoscaling operation can automatically detect if the backend storage platform has gone down or there is a failure to discover the backend storage platform, and thus automatically invokes autoscaling. The autoscaling utilizes storage application programming interfaces (APIs) to discover and access storage endpoints (e.g., storage of the backend storage platform or a different backend storage platform) that can be used to allocate healthy storage resources for use by the containerized application. In this way, the containerized application can continue operating by utilizing the allocated storage resources from the storage endpoints even if the backend storage platform went down or could not be discovered.

The coupled compute and storage autoscaling operation can be performed during execution of the application such as where storage resources are autoscaled as part of the same scaling operation to add additional compute resources to the containerized application in order to scale up to meet demand (e.g., additional resources to perform a backup or restore task). As part of scaling up the compute resource in order to meet processing demand to perform the task, the storage resources assigned to the containerized application are also scaled up and the health of the storage resources is verified. With the coupled compute and storage autoscaling operation, the scaling of additional compute resources is tightly coupled with storage resource scaling. In particular, as part of performing compute scaling, the autoscaling technique performs a verification as to whether existing storage is adequate and/or healthy (e.g., a determination as to whether some existing storage has failed or is operating in a warning/degraded state).

If there is a problem with the existing storage resources assigned to the containerized application that could otherwise result in a failure of the containerized application, then additional storage resources are automatically added to scale up heathy storage with the scaling of the compute resources. The coupled compute and storage autoscaling operation can be performed during runtime such as when the application is performing data protection functionality to ensure that the data protection functionality (e.g., a backup procedure) does not fail due to a storage issue. Also, by auto scaling both compute and storage resources together and early on during deployment as opposed to in reaction to a failure, the coupled compute and storage autoscaling operation ensures that both compute and storage resources will be in a healthy state for proper operation of the containerized application. Thus, any potential issues with inadequate compute or storage resources can be addressed upfront during deployment.

The coupled compute and storage autoscaling operation increases the speed and scalability for detecting and recovering from storage health issues so that containerized applications do not run out of storage and experience errors. The coupled compute and storage autoscaling operation is tailored to orchestrate the scaling of compute resources within the container orchestration platform (e.g., Kubernetes) of the compute region with the scaling of the storage resources within the backend storage platform of the storage region (e.g., a cloud storage provider) even though the compute region and the storage region may be completed different computing environments and/or maintained by different service providers. Tightly coupled compute and node scaling is more efficient than prior techniques that separately scale compute resources (e.g., Kubernetes would manage and perform compute scaling without knowledge or regard to what the backend storage platform is doing) and storage resources (e.g., the backend storage platform would manage and perform compute scaling without knowledge or regard to what Kubernetes is doing) in a reactive manner once there is a problem. Because scaling compute and storage resources together is more efficient and quicker than these prior techniques, the cost associated with scaling is reduced, especially with public clouds where cost is attributed to the time to perform operations (e.g., a long running task that runs out of healthy storage would become costly to continue hosting).

The coupled compute and storage autoscaling operation performs tightly coupled compute and storage resource autoscaling by scaling/allocating a certain amount of storage resources that may be calculated based upon an amount of compute resources to be allocated to the containerized application during deployment and/or runtime. In some embodiments, the coupled compute and storage autoscaling operation is performed as a single combined operation by a single autoscaler that has the capability to monitor, understand, and orchestrate resource allocation and what is going on within both the container orchestration environment and the backend storage platform (e.g., both health of storage and task execution progress). The autoscaler has a storage region interface tailored for accessing storage APIs of the storage region for scaling storage resources (e.g., accessing storage APIs of a cloud storage provider to identify storage endpoints of healthy storage) and has a compute region interface tailored for accessing a compute allocator of the container orchestration platform for scaling compute resources (e.g., accessing a Kubernetes pod autoscaler).

The coupled compute and storage autoscaling operation triggers the health verification and allocation of the storage resources within the storage region in response to a determination that compute resources are to be allocated to the containerized application during deployment or runtime. The coupled compute and storage autoscaling operation may be performed in a preemptive manner where compute resources are not allocated until healthy storage resources have been identified so that the compute and healthy storage resources are allocated together (e.g., as opposed to performing autoscaling after the compute resources have been allocated and there is a subsequently identified storage failure). If storage resources of a particular backend storage platform are unavailable (e.g., a cloud storage provider of the backend storage platform is experiencing a failure), then storage resources of a different backend storage platform (e.g., a different cloud storage provider) can be identified and used for autoscaling by the coupled compute and storage autoscaling operation. The coupled compute and storage autoscaling operation can evaluate a task to be performed by the containerized application in order to determine an amount of compute resources and storage resources to allocate to the containerized application so that the calculation of compute and storage resources is tightly coupled. The coupled compute and storage autoscaling operation can evaluate an amount of compute resources to be allocated in order to determine how much storage resources can be used by that amount of compute resources so that the compute and storage resources can scale together (e.g., in a proportional amount).

In addition, various embodiments of the present technology provide for a wide range of technical effects, advantages, and/or improvements to computing systems and components. For example, various embodiments may include one or more of the following technical effects, advantages, and/or improvements: 1) automatically monitoring the health of a backend storage platform and storage resources assigned to a containerized application during deployment of the application for preemptively identifying and addressing storage failures; 2) automatically monitoring the health of the backend storage platform and the storage resources assigned to the application during runtime of the application for quickly identifying and addressing storage failures without extensive manual troubleshooting to determine why a task using the failed storage has failed; 3) autoscaling compute and storage together in a tightly coupled manner to ensure that there is available healthy storage that will be used by the compute resources before the compute resources are allocated; 4) monitoring both a container orchestration environment (e.g., Kubernetes) and a backend storage platform for issues related to the containerized application within the container orchestration environment accessing storage resources of the backend storage platform; and 6) implementing a dashboard user interface so that users are provided with insight into compute and storage allocations, utilization, and autoscaling.

FIG. 1A is a block diagram illustrating an example of cloud computing environments used to host various types of services, in accordance with an embodiment of the present technology. Cloud storage providers may host public clouds 100 through which clients can store data, host applications, access services, create a tenancy of a multi-tenant environment, etc. A client may also utilize a private cloud 104 for use by that client to store data, host applications and services, etc. The private cloud 104 may comprise dedicated hardware and/or software for use by the client (e.g., on-premise servers and storage). The client may utilize application hosting and storage provider services 112 of a storage provider 102. The application hosting and storage provider services 112 may provide various functionality to the client such as backup and restore functionality, data protection, failover protection, encryption, deduplication, compression, snapshot functionality, data mirroring, redundant data storage, and/or other functionality provided for applications, client data, and/or services hosted by the client through the private cloud 104 and/or the public clouds 100. This functionality may be performed by applications that are assigned storage resources and compute resources to perform tasks (e.g., a backup task, a restore task, etc.). If the storage resources and the compute resources are not aligned (e.g., an application is allocated compute resources to perform a backup task to create a backup, but not enough storage resources to store the backup), then the task may fail. As provided herein, an autoscaler is configured to autoscale both the compute resources and the storage resources together in a tightly coupled manner to ensure that the application has both adequate compute and storage resources to successfully perform the task.

The public clouds 100 may be hosted across one or more data centers comprising hardware (e.g., storage devices, routers, processors, servers, network equipment, etc.) used to host compute regions for hosting applications and/or storage regions for storing client data. In some embodiments, a first compute region **106*a* and a first storage region 108*a* are hosted within a first data center of the public clouds. The first compute region 106*a* may be configured to host applications on behalf of clients. In some embodiments, the applications may be hosted as containerized applications that execute within containers hosted by a container orchestration platform of the first compute region 106*a*. The applications within the first compute region 106*a* in the first data center may store data within the first storage region 108*a* in the first data center. The first compute region 106*a*** allocates compute resources of the first data center to the containers used to host and execute the applications within the first compute region 106_a_. The first storage region 108_a_ allocates storage resources of the first data center to the applications hosted within the first compute region 106_a_.

A second compute region 106_b_ may be hosted within a second data center of the public clouds 100. A second storage region 108_b_ may be hosted within a third data center of the public clouds 100. The second compute region 106_b_ may be configured to host applications on behalf of clients. In some embodiments, the applications may be hosted as containerized applications that execute within containers hosted by a container orchestration platform of the second compute region 106_b_. The applications within the second compute region 106_b_ in the second data center may store data within the second storage region 108_b_ in the third data center. The second compute region 106_b_ allocates compute resources of the second data center to the containers used to host and execute the applications within the second compute region 106_b_. The second storage region 108_b_ may allocate storage resources of the third data center to the applications hosted within the second compute region 106_b_.

The client may host a third compute region 106_c_ and a third storage region 108_c_ within the private cloud 104. The client may host applications within the third compute region 106_c_. In some embodiments, the applications may be hosted as containerized applications that execute within containers hosted by a container orchestration platform of the third compute region 106_c_. The applications within the third compute region 106_c_ may store data within the third storage region 108_c_ and/or the second storage region 108_b_ of the third data center of the public clouds 100. The third compute region 106_c_ allocates compute resources of the private cloud 104 to the containers used to host and execute the applications within the third compute region 106_c_. The third storage region 108_c_ allocates storage resources of the private cloud 104 to the applications hosted within the third compute region 106_c_. The private cloud 104 may also host a storage operating system 110 through which the client can access the applications and/or client data stored through the private cloud 104 and/or the public clouds 100.

In some embodiments, the storage provider 102 may host the application hosting and storage provider services 112 within a fourth data center. In some embodiments, the storage provider 102 may host the application hosting and storage provider services 112 within the public clouds 100, the private cloud 104, or other computing environment. The application hosting and storage provider services 112 may orchestrate the deployment of applications hosted within the compute regions 106_a_, 106_b_, and 106_c_. The application hosting and storage provider services 112 may orchestrate the assignment of storage resources of the storage regions 108_a_, 108_c_, and 108_c_ to the applications. As will be discussed in further detail, the application hosting and storage provider services 112 may host an autoscaler configured to monitor for failures within the compute regions 106_a_, 106_b_, and 106_c_ and/or the storage regions 108_a_, 108_c_, and 108_c_, and perform autoscaling of compute resources and/or storage resources assigned the applications.

Figure 1B:
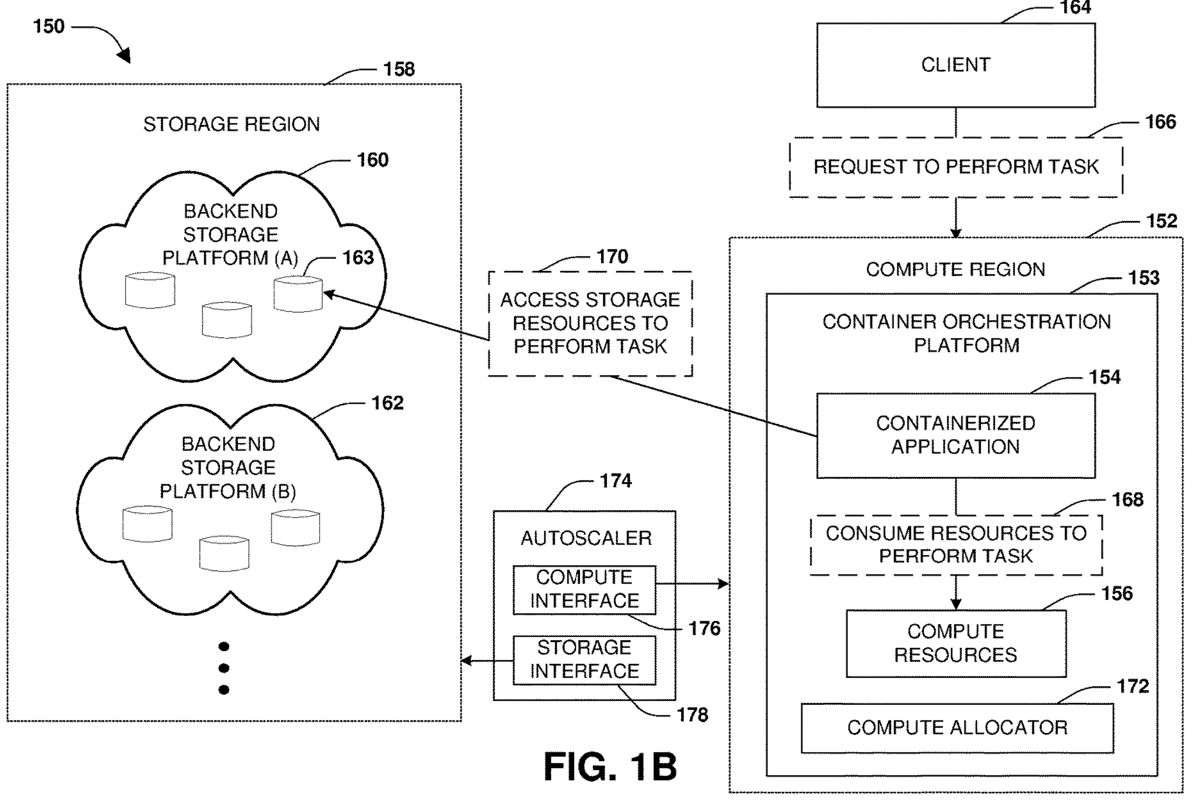
FIG. 1B is a block diagram illustrating an example of a compute region and a storage region, in accordance with an embodiment of the present technology.

FIG. 1B is a block diagram 150 illustrating an example of a compute region 152 and a storage region 158, in accordance with an embodiment of the present technology. The compute region 152 may correspond to a computing environment that hosts applications using compute resources such as CPUs, memory, nodes, virtual machines, physical hosts, etc. In some embodiments, a containerized application 154 may be hosted within a container of a container orchestration platform 153 of the compute region 152 (e.g., Kubernetes). The containerized application 154 may be configured to perform tasks. In some embodiments, the tasks may correspond to data protection tasks to backup data, create snapshots, restore data using a snapshot, etc. A client 164 may transmit a request 166 to the containerized application 154 to perform a task such as a backup task.

During deployment of the containerized application 154 and/or during runtime of the containerized application 154 performing the backup task, compute resources 156 and storage resources 163 may be allocated to the containerized application 154 by an autoscaler 174. The autoscaler 174 may be hosted within the compute region 152 (e.g., within a container) or within a different computing environment external to the compute region 152 (e.g., within a computing device with network connectivity to the compute region 152). The autoscaler 174 utilizes a compute region interface 176 to access the container orchestration platform 153. The compute region interface 176 may comprise functionality used to translate commands from the autoscaler 174 into a format supported by the container orchestration platform 153 (e.g., format resource allocation commands into a format and communication protocol utilized by Kubernetes). In this way, the autoscaler 174 can utilize the compute region interface 176 to obtain information related to execution of the containerized application 154, progress of performing the backup task, failure of the backup task, current compute resource allocations, application failures, etc. The autoscaler 174 can utilize the compute region interface 176 to facilitate the deployment of the containerized application 154 within a container used to host the containerized application 154. The autoscaler 174 can utilize the compute region interface 176 to access a compute allocator 172 of the container orchestration platform 153. In some embodiments, the compute allocator 172 may be a Kubernetes pod autoscaler that assigns compute resources to pods used to manage containers. A pod may be a logical wrapper entity for the container hosting the containerized application 154 to execute on a cluster (e.g., a K8s cluster). In some embodiments, the compute resources 156 are allocated to the pod managing the container so that the compute resources 156 allocated to the pod are available/allocated to the containerized application 154 through the pod managing the container.

The storage resources 163 allocated to the containerized application 154 may be hosted within a storage region 158 separate from the compute region 152 (e.g., a different computing environment, a different data center, a different cloud region, a different set of computing devices, a cloud storage provider different than a provider of the compute region 152, different hardware or software, etc.). The storage region 158 may encompass a single backend storage platform or multiple different backend storage platforms (e.g., different data centers hosted by different cloud storage providers or hosted at different cloud regions). The storage region 158 may include a backend storage platform (A) 160, a backend storage platform (B) 162, and/or other backend storage platforms. The storage region 158 may utilize storage APIs (e.g., REST API) for providing read, write, and/or other types of access to data and services of the storage region 158. The autoscaler 174 utilizes a storage region interface 178 to communicate with the storage region 518 using the storage APIs supported by the storage region 158. The autoscaler 174 can utilize the storage region interface 178 to transmit storage API requests to the backend storage platform (A) 163 for allocating the storage resources 163 to the containerized application 154.

The autoscaler 174 performs tightly coupled compute and storage scaling during deployment of the containerized application 154 within the container orchestration platform 153 of the compute region 152 to ensure the compute and storage resources are properly aligned. The autoscaler 174 determines an amount of compute resources 156 (e.g., 0.25 CPU and 64 MiB) to allocate to the containerized application 154 (e.g., allocate to the pod managing the container within which the containerized application 154 will be deployed). In some embodiments, the amount of compute resources 156 may be defined within a configuration file for the containerized application 154. In some embodiments, the configuration file is a container image that is a ready-to-run software package containing everything needed to run the containerized application 154 such as code and runtime required to run the containerized application 154, application and system libraries, and/or default values for settings. The configuration file may specify an amount of processor and memory that is to be allocated to the containerized application 154.

In some embodiments, the amount of compute resources 156 may be determined based upon a task or workload that is to be performed by the containerized application 154. A snapshot creation task where the containerized application 154 is to create an incremental snapshot of a volume may consume a certain amount of processor and memory resources, which may be used to determine the amount of compute resources 156. In some embodiments, the amount of compute resources 156 may be determined based upon a service level agreement (SLO) specified for the containerized application 154 (e.g., the client 164 may subscribe through a provider of the compute region 152 to a certain amount of guaranteed compute resources for hosting the containerized application 154 or a certain timeframe within which backup operates are to complete). In this way, the autoscaler 174 utilizes the compute region interface 176 to access the compute region 152 in order to determine the amount of compute resources 156 of the compute region 152 that the compute allocator 172 is to allocate to the containerized application 154 for being hosted through the container orchestration platform 153.

The autoscaler 174 determines an amount of storage resources 163 of the storage region 158 to allocate to the containerized application (e.g., an amount of persistent storage of the backend storage platform (A) 160 to allocate for storing the incremental snapshot). In some embodiments, the autoscaler 174 determines the amount of storage resources 163 based upon the amount of compute resources 156 that are to be allocated to the containerized application 154 (e.g., a proportional amount of storage may be assigned based upon the amount of compute resources 156, such as a small amount of storage may be allocated based upon a small amount of processor resources to be allocated). In some embodiments, the amount of storage resources 163 is determined based upon an amount of storage that can be utilized by the amount of compute resources 156. If a large amount of processor and memory resources are to be allocated, then a large amount of storage resources may be allocated. If a small amount of processor and memory resources are to be allocated, then a small amount of storage resources may be allocated since the small amount of processor and memory resources may only be able to utilize the small amount of storage resources. In some embodiments where the amount of compute resources 156 are determined based upon the snapshot creation task, the amount of storage resources 163 may be determined based upon the snapshot creation task. The snapshot creation task may create an incremental snapshot that will have a certain size such as 100 mb, and thus the amount of storage resources 163 may be determined to be at least 100 mb or more (e.g., 100 mb plus a 10% padding of 10 mb for a total of 110 mb). In this way, the amount of storage resources 163 can be determined based upon the amount of storage the compute resources 156 will utilize to perform the snapshot creation task.

Other information or types of operations may be used to determine the amount of storage resources 163 to allocate. In some embodiments, the containerized application 154 is being deployed on-demand to perform a restore operation to restore the volume using a snapshot. The restore operation may be evaluated to determine an amount of data that is to be restored and a timeframe to complete the restore operation (e.g., the SLO may specify that restore operations are to be performed within 20 minutes or less or at a certain restore data rate). Accordingly, information about the restore operation may be used to determine the amount of compute resources 156 (e.g., processor and memory resources that will enable the restore operation to completed within 20 minutes of less) and/or the amount of storage resources 163 to allocate to the containerized application 154 (e.g., an amount of storage needed to store the volume being restored, along with a padding amount such as an additional 20% of storage beyond the size of the volume). In some embodiments, a backup policy to be implemented by the containerized application 154 may be evaluated to determine a frequency of creating backups and/or the amount of data being backed up (e.g., a current size of a volume that will be backed up daily). This information about the backup policy may be used to determine the amount of compute resources 156 and/or the amount of storage resources 163 to allocate to the containerized application 154 (e.g., an amount of storage needed to store the current size of the volume; an amount of storage needed to store a week's worth of backups of the volume; a projected size of the volume for a next backup as determined based upon a historic rate of size increase of the volume over time).

Before the amount of compute resources 156 and the amount of storage resources 163 are allocated, the autoscaler 174 utilizes the storage region interface 178 to perform a health verification of storage of the storage region 158. The autoscaler 174 may perform the health verification to determine the health status of first storage of the backend storage platform (A) 160 that could be allocated as the amount of storage resources 163 for use by the containerized application 154. In some embodiments, the health status may indicate whether the first storage is fully operational, has degraded health, etc. In some embodiments, the health verification may fail to obtain a response from the backend storage platform (A) 160, and thus the first storage may be determined as not being accessible to the compute region 152 such as due to a network error or failure of the backend storage platform (A) 160. In some embodiments, the health verification may determine whether a version of the container orchestration platform 153 (e.g., version 2.45) matches a version of the backend storage platform (A) 160. If the versions do not match, then the containerized application 154 may be unable to access storage of the backend storage platform (A) 160, and thus the autoscaler 174 will identify storage of a different backend storage platform, having a matching version (e.g., version 2.45), which can be used for the amounted of storage resources 163 being allocated to the containerized application 154.

If the health verification indicates that the first storage of the backend storage platform (A) 160 is operational and accessible to the compute region 152, then the autoscaler 174 may determine that the first storage is to be allocated as the amount of storage resources 163. If the health verification indicates that the first storage of the backend storage platform (A) 160 is not operational or is not accessible to the compute region 152, then the autoscaler 174 will utilize the storage region interface 178 to identify a storage endpoint within the storage region 158 that has storage that is operational and accessible to the compute region 152. The storage endpoint may correspond to different storage of the backend storage platform (A) 160 or storage of a different backend storage platform such as the backend storage platform (B) 162.

Once the autoscaler 174 has identified storage that is operational and accessible to the compute region 152, the autoscaler 174 utilizes the compute region interface 176 and the storage region interface 178 to perform a coupled compute and storage autoscale operation. The coupled compute and storage autoscale operation scales/allocates both the compute resources and the storage resources together to ensure that the storage resources are operational and ready for used by the time the compute resources are allocated and ready to use by the containerized application 154 for performing tasks using the storage resources. In some embodiments, the coupled compute and storage autoscale operation is performed as a single atomic operation that either successfully scales/allocates both the amount of compute resources 156 to the containerized application 154 and the amount of storage resources 163 to the containerized application 154 or fails. The coupled compute and storage autoscale operation utilizes the compute region interface 176 to instruct the compute allocator 172 to allocate the amount of compute resources 156 to the containerized application 154 (e.g., allocate a certain number of nodes, physical hosts, virtual machines, memory, processor resources, etc.). The coupled compute and storage autoscale operation uses the storage region interface 178 to instruct the backend storage platform (A) 1634 to allocate the amount of storage resources 163 to the containerized application using storage determined to be operational and accessible to the compute region 152 (e.g., a certain number of storage nodes assigned according to a random assignment, a certain number of storage devices, a certain amount of storage, etc.).

In some embodiments of the autoscaler 174 accessing the compute region 152 and the storage region 158, the autoscaler 174 must authenticate with the compute region 152 and the storage region 158. Because the compute region 152 and the storage region 158 are different computing environments, the autoscaler 174 may separately authenticate with each of the regions. The autoscaler 174 may access security credentials associated with the containerized application 154 and the container orchestration platform 153. The autoscaler 174 utilizes the security credentials to authenticate with the compute region 152, such as to obtain authorization to instruct the compute allocator 172 to allocate the amount of compute resources 156. The autoscaler 174 utilizes the security credentials to authenticate with the storage region 158, such as to obtain authorization to instruct the backend storage platform (A) 160 to allocate the amount of storage resources 163.

The autoscaler 174 may perform the coupled compute and storage autoscale operation during runtime of the containerized application 154 such as when compute resources are to be scaled up for the containerized application 154 to perform a task. During execution, the containerized application 154 may consume 168 the compute resources 156 and access 170 the storage resources 163 to perform the task. The autoscaler 174 may utilize the compute region interface 176 to monitor progress of the task to see if the task has failed or not. If the task has failed, then the autoscaler 174 utilizes the storage region interface 178 to perform a health check on the storage resources 163 to see if the storage resources 163 are the reason for the failure. If the heath check indicates that the storage resources 163 are operating in a degraded state, are not operational, or are inaccessible to the compute region 152, the autoscaler 174 executes the coupled compute and storage autoscale operation in order to identify and allocate healthy storage (e.g., storage of the backend storage platform (B) 162 or different storage of the backend storage platform (A) 160) to the containerized application 154 for further performing the task. Similarly, the autoscaler 174 may monitor communication between the containerized application 154 and the storage resources 163. If there is a communication issue where the containerized application 154 cannot access the storage resources 163, then the autoscaler 174 executes the coupled compute and storage autoscale operation in order to identify and allocate healthy storage to the containerized application 154.

The autoscaler 174 may also monitor the backend storage platform (A) 163. If the backend storage platform (A) 163 experiences a failure where the containerized application 154 cannot access the storage resources 163, then the autoscaler 174 executes the coupled compute and storage autoscale operation in order to identify and allocate healthy storage to the containerized application 154. The healthy storage may be identified from a different backend storage platform such as the backend storage platform (B) 162. In particular, backend storage platforms may be hosted within different cloud storage regions (e.g., a US West region vs a US East region) or by different cloud storage providers, and thus a different backend storage platform may not be experiencing the failure that the backend storage platform (A) 160 is experiencing.

The autoscaler 174 may periodically perform a health check during execution of the containerized application 154 and/or when compute resources are to be allocated to the containerized application 154 (e.g., additional compute resources are to be allocated for performing a new task). The autoscaler 174 transmits a health checkup request to the backend storage platform (A) 160 to determine a health status of the storage resources 163 and/or additional storage resources that can be used to scale storage with the scaling of the additional compute. If the storage resources 163 and/or additional storage resources are operating in a degraded state, are not operational, or are inaccessible to the compute region 152, the autoscaler 174 executes the coupled compute and storage autoscale operation in order to identify and allocate healthy storage to the containerized application 154.

Figure 2A:
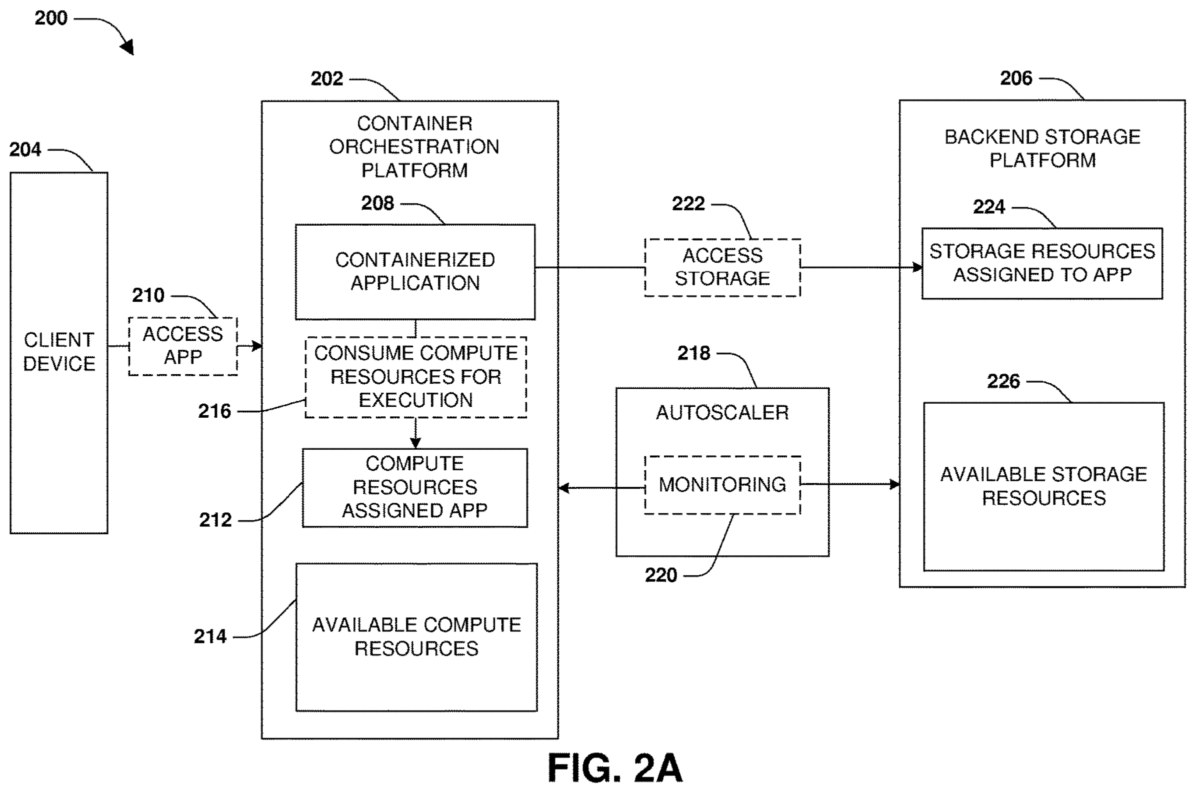
FIG. 2A is a block diagram illustrating an example of an autoscaler monitoring the health of storage resources assigned to an application, in accordance with an embodiment of the present technology.

FIG. 2A is a block diagram 200 illustrating an example of an autoscaler 218 monitoring the health of storage resources 224 assigned to an application, in accordance with an embodiment of the present technology. A container orchestration platform 202 (e.g., Kubernetes) has available compute resources 214 (e.g., virtual machines, nodes, physical hosts and devices, memory, CPU, etc.) that can be assigned to containers within which containerized applications can be executed using the compute resources. In some embodiments, a containerized application 208 may be hosted by the container orchestration platform 202 within a container that is managed by a pod. In order to allocate the containerized application 208 with compute resources 212, the compute resources 212 are assigning the pod from the available compute resources 214. The containerized application 208 can consume 216 the compute resources 212 during execution for performing tasks such as data protection tasks (e.g., snapshot creation, backup and restore, data mirroring, failover, etc.). A client device 204 may be provided with access 210 to the containerized application 208. The containerized application 208 may provide the client device 204 with read and write access to client data maintained by the containerized application 208. The client device 204 may invoke the containerized application 208 to perform various tasks.

A backend storage platform 206 may provide clients, applications, and services with storage resources from available storage resources 226. The available storage resources 226 may comprise one or more tiers of storage (e.g., an expedited storage tier of solid-state devices with fast storage access speeds; a standard storage tier of hard disk drives with standard storage access speeds; a bulk/glacier tier with slow storage access speeds; etc.). In some embodiments, the backend storage platform 206 may be part of a storage region that includes one or more cloud storage providers, multiple cloud regions, data centers, physical devices, etc. In order for the containerized application 208 to persist data, the application 208 may be assigned storage resources 224 from the available storage resources 226 of the backend storage platform 206. The storage resources 224 may include a certain amount of storage that may be utilized for storing data through volumes, LUNs, storage buckets, or other objects. In some embodiments, the application 208 is allocated 4 terabytes of storage from the standard storage tier and 100 gigabytes of storage from the expedited storage tier as the storage resource 224. In this way, the containerized application 208 may access 222 the storage resources 224 while performing tasks that are executed using the compute resources 212.

Figure 2B:
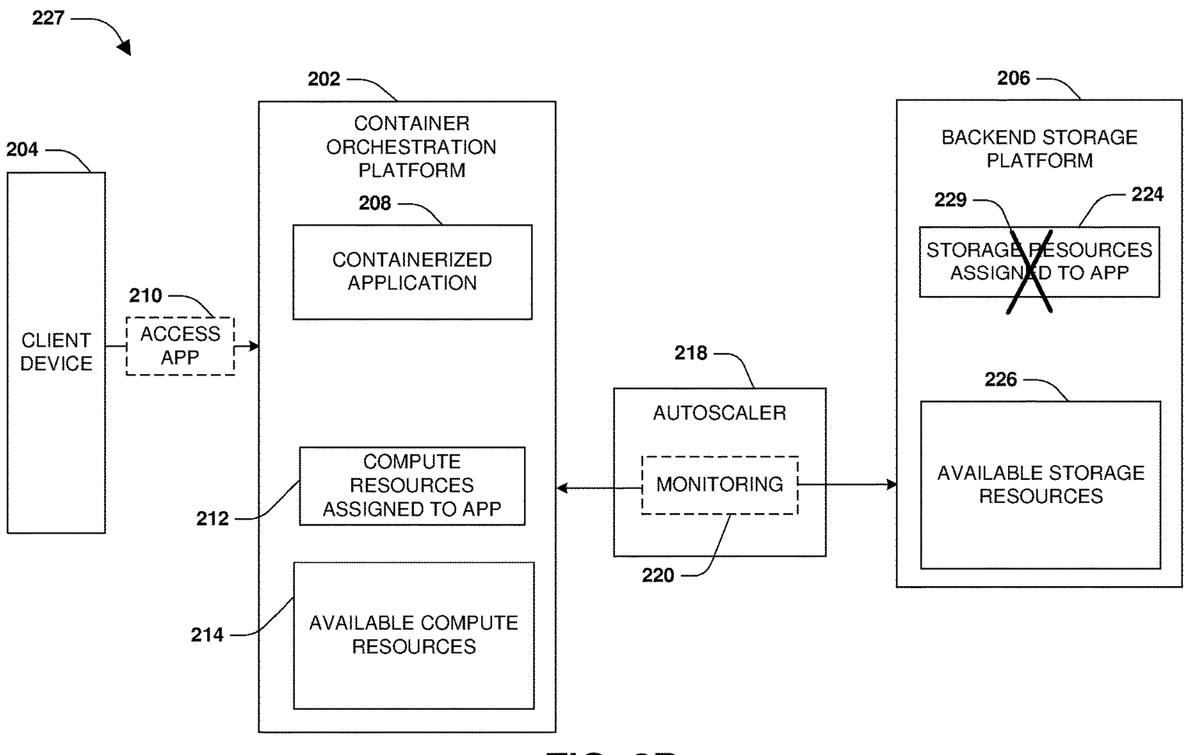
FIG. 2B is a block diagram illustrating an example of an autoscaler identifying an issue with respect to storage resources assigned to an application, in accordance with an embodiment of the present technology.

An autoscaler 218 is configured to monitor 220 the container orchestration platform 202 and/or the backend storage platform 206 to determine whether to trigger a coupled compute and storage autoscale operation, as illustrated by block diagram 227 of FIG. 2B illustrating an example of the autoscaler 218 identifying an issue 229 with respect to the storage resources 224 assigned to containerized application 208, in accordance with an embodiment of the present technology. The autoscaler 218 may monitor 220 the container orchestration platform 202 to determine that the compute resources 212 assigned to the containerized application 208 are to be scaled up in order to perform a backup task. Before the compute resources 212 are scaled up, the autoscaler 218 performs a check on the storage resources 224 assigned to the containerized application 208. In some embodiments, the check may determine whether the storage resources 224 assigned to the containerized application 208 are adequate for performing a task assigned to the containerized application 208. In some embodiments, the check may determine whether the storage resources 224 are aligned with the compute resources 212 that are to be assigned (scaled up) for the containerized application 208 (e.g., if additional processor resources are being assigned to perform a snapshot creation task to create a snapshot, then the check may determine whether there is adequate available storage resources 224 that have free storage for storing the snapshot). In some embodiments, the check may determine whether the storage resources 224 are in compliance with a service level agreement (SLA) subscribed to by the containerized application 208 (e.g., do the storage resources 224 provide an adequate or required amount of read/write bandwidth or throughput). In some embodiments, the check is a health check to identify a current operational state of the storage resources 224.

Figure 2C:
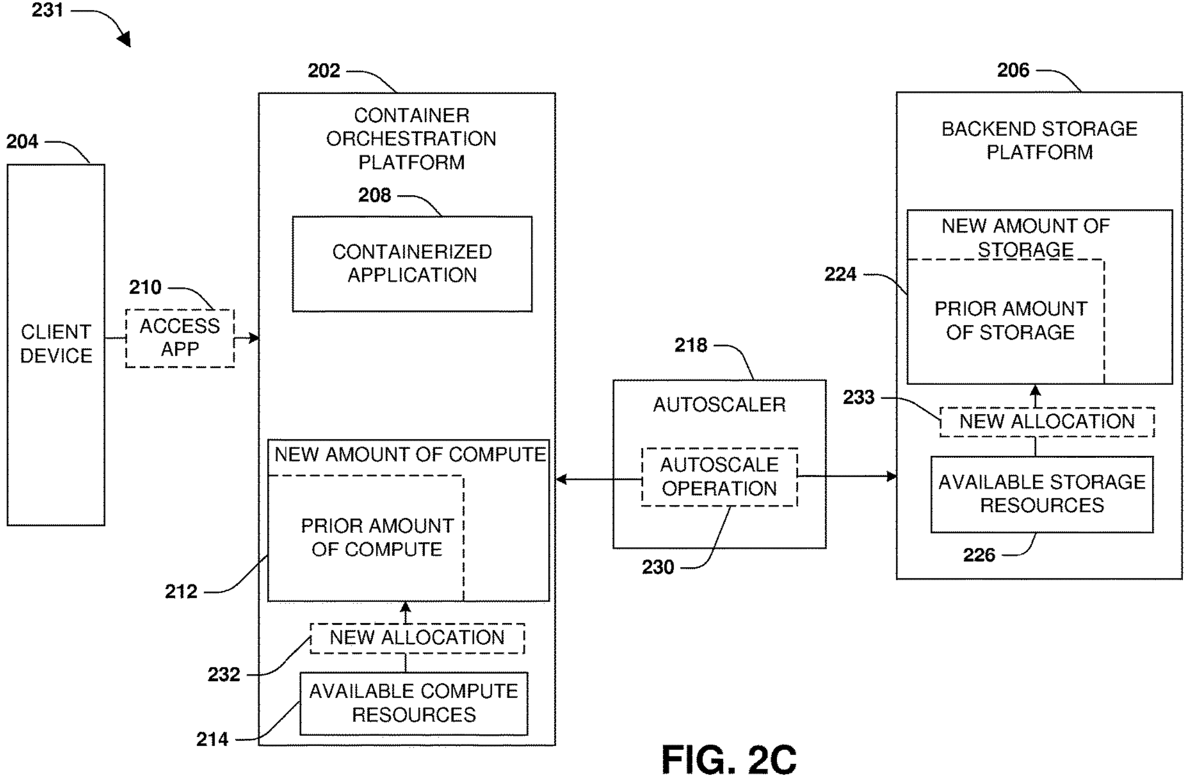
FIG. 2C is a block diagram illustrating an example of an autoscaler performing a coupled compute and storage autoscale operation, in accordance with an embodiment of the present technology.

In response to the check identifying the issue 229 with respect the storage resources 224 that would otherwise be used to perform the backup task (e.g., a failed storage device), the autoscaler 218 triggers a coupled compute and storage autoscale operation 230 as illustrated by block diagram 231 of FIG. 2C illustrating an example of the autoscaler 218 performing the coupled compute and storage autoscale operation 230, in accordance with an embodiment of the present technology. The coupled compute and storage autoscale operation 230 determines a new amount of compute resources to allocate as the compute resources 212 assigned to the containerized application 208. The coupled compute and storage autoscale operation 230 determines a new amount of storage resources to allocate as the storage resources 224 assigned to the containerized application 208. The new amount of storage resources may be identified based upon the new amount of compute resources to be allocated to the containerized application 208. The coupled compute and storage autoscale operation 230 identifies healthy storage resources of the available storage resources 226 to allocate as the new amount of storage resources. In this way, the storage resources 224 affected by the issue 229 are replaced with the healthy storage resources.

Figure 2D:
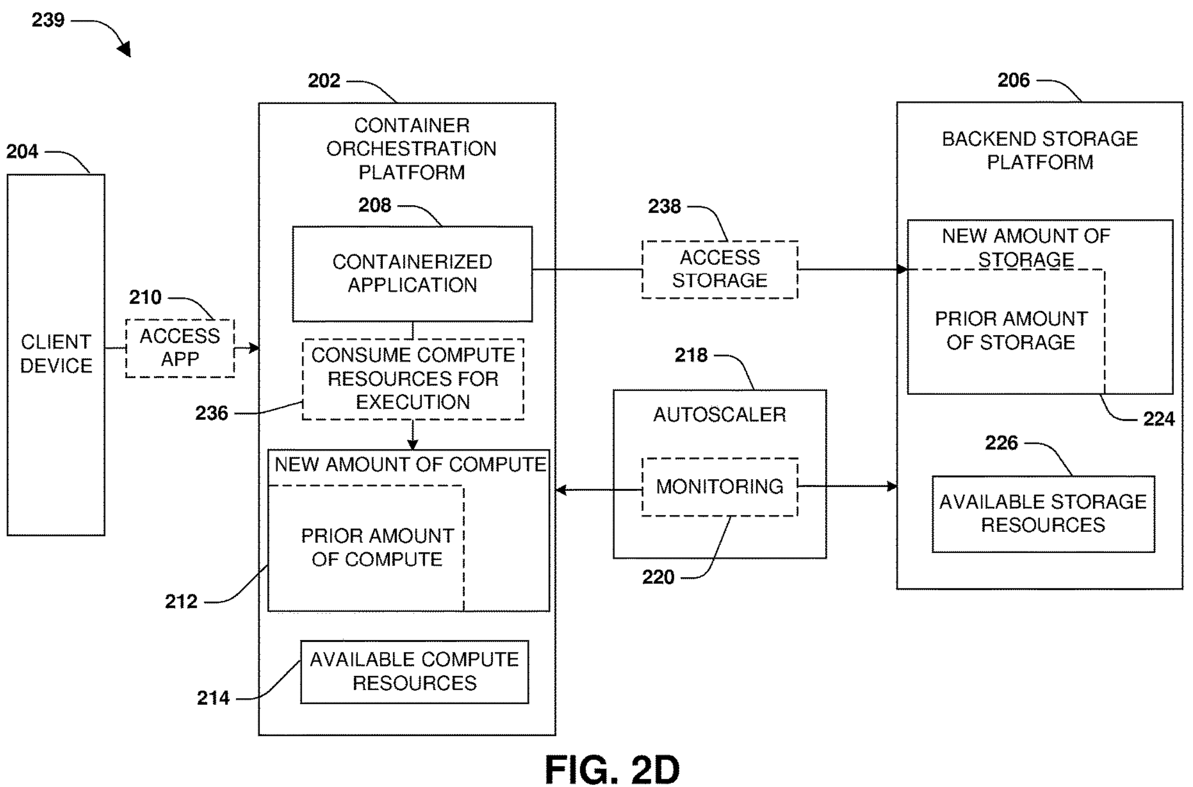
FIG. 2D is a block diagram illustrating an example of an application being allocated a new amount of compute resources and storage resources, in accordance with an embodiment of the present technology.

Once the new amount of compute resources and the new amount of storage resources have been identified, the coupled compute and storage autoscale operation 230 instructs the container orchestration platform 202 to perform a new allocation 232 of compute resources from the available compute resources 214 as the compute resources 212 (the new amount of compute resources larger than the prior amount of compute resources) allocated to the containerized application 208. The coupled compute and storage autoscale operation 230 also instructs the backend storage platform 206 to perform a new allocation 233 of storage resources from the available storage resources 226 as the storage resources 224 (e.g., the new amount of storage resources larger than the prior amount of storage resources, historically storage resources that are failing are removed and new storage resources are added, unused and unneeded storage resources are removed, etc.) are updated and assigned to the containerized application 208. The realignment of the compute resources 212 and the storage resources 224 (e.g., scaling up of resources, scaling down of resources, replacing unhealthy or underperforming storage devices with different storage resources that are in compliance with a subscribed to SLA, etc.) is performed as a tightly coupled operation (e.g., a single atomic operation where the compute resources 212 are not allocated before healthy storage has been identified and is ready to be allocated or has been allocated). After the coupled compute and storage autoscale operation 230, the containerized application 208 consumes 236 the compute resources 212 and accesses 238 the storage resources 224 for execution of the task, as illustrated by the block diagram 239 of FIG. 2D illustrating an example of an application being allocated a new amount of compute resources and storage resources, in accordance with an embodiment of the present technology.

Figure 3:
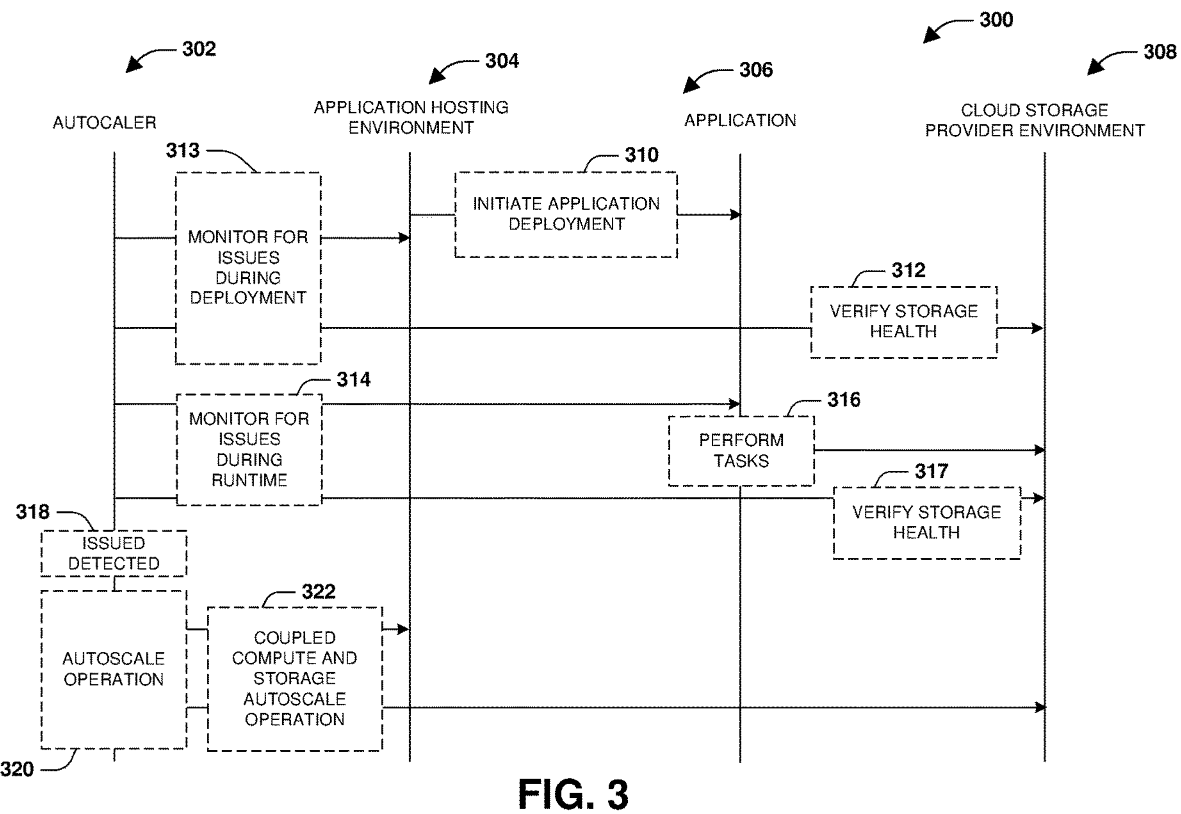
FIG. 3 is a sequence diagram illustrating an example of a set of operations for coupled compute and storage resource autoscaling, in accordance with various embodiments of the present technology.

FIG. 3 is a sequence diagram 300 illustrating an example of a set of operations for coupled compute and storage resource autoscaling, in accordance with various embodiments of the present technology. An autoscaler 302 may be configured to trigger a coupled compute and storage autoscale operation during deployment and/or runtime of an application hosted within an application hosting environment 304. The application 306 is hosted within the application hosting environment 304 (e.g., an on-premise server, an application hosting service, a cloud compute environment for hosting applications, a virtual machine, etc.) that is different than a cloud storage provide environment 308 that hosts persistent storage that the application 306 can use for storing data. The application hosting environment 304 may initiate 310 the deployment of the application 306. During deployment, the autoscaler 302 monitors 313 for issues. The autoscaler 302 may determine an amount of compute resources that are to be allocated by the application hosting environment 304 to the application 306. The autoscaler 302 may determine an amount of storage resources to allocate to the application 306 based upon the amount of compute resources to allocate to the application 306.

Before the compute resources are allocated to the application 306, the autoscaler 302 verifies 312 as to whether the cloud storage provider environment 308 has adequate operational storage that is accessible to the application hosting environment 304 to allocate as the storage resources for use by the application 306. If the cloud storage provider environment 308 has adequate operational storage, then the compute and storage resources are allocated and the application 306 is deployed. Otherwise, if an issue is detected 318 because there is not adequate operational storage, then an autoscale operation 320 is executed to perform a coupled compute and storage autoscale operation 322. The coupled compute and storage autoscale operation 322 is performed to identify different/new storage that is operational and can be allocated as the storage resources. Once identified, the coupled compute and storage autoscale operation allocates both the compute resources and the storage resources to complete deployment.

Similarly, the autoscaler 302 may monitor 314 for issues during runtime of the application 306, such as when additional compute resources are to be allocated to the application 306 to perform 316 tasks. Before the additional compute resources are allocated to the application 306, the autoscaler 302 verifies 317 as to whether the currently assigned storage resources are healthy and/or whether the cloud storage provider environment 308 has adequate operational storage that is accessible to the application hosting environment 304 to allocate as additional storage resources for performing 316 the tasks. If the cloud storage provider environment 308 has adequate operational storage, then the additional compute and additional storage resources are allocated for the application to perform 316 the tasks. Otherwise, if an issue is detected 318 because there is not adequate operational storage, then an autoscale operation 320 is executed to perform the coupled compute and storage autoscale operation 322. The coupled compute and storage autoscale operation 322 is performed to identify different/new storage that is operational and can be allocated as the additional storage resources and/or replace any existing storage resources that are not operational or have degraded performance/health. Once identified, the coupled compute and storage autoscale operation allocates both the compute resources and the storage resources for the application 306 to perform 316 the tasks.

Figure 4:
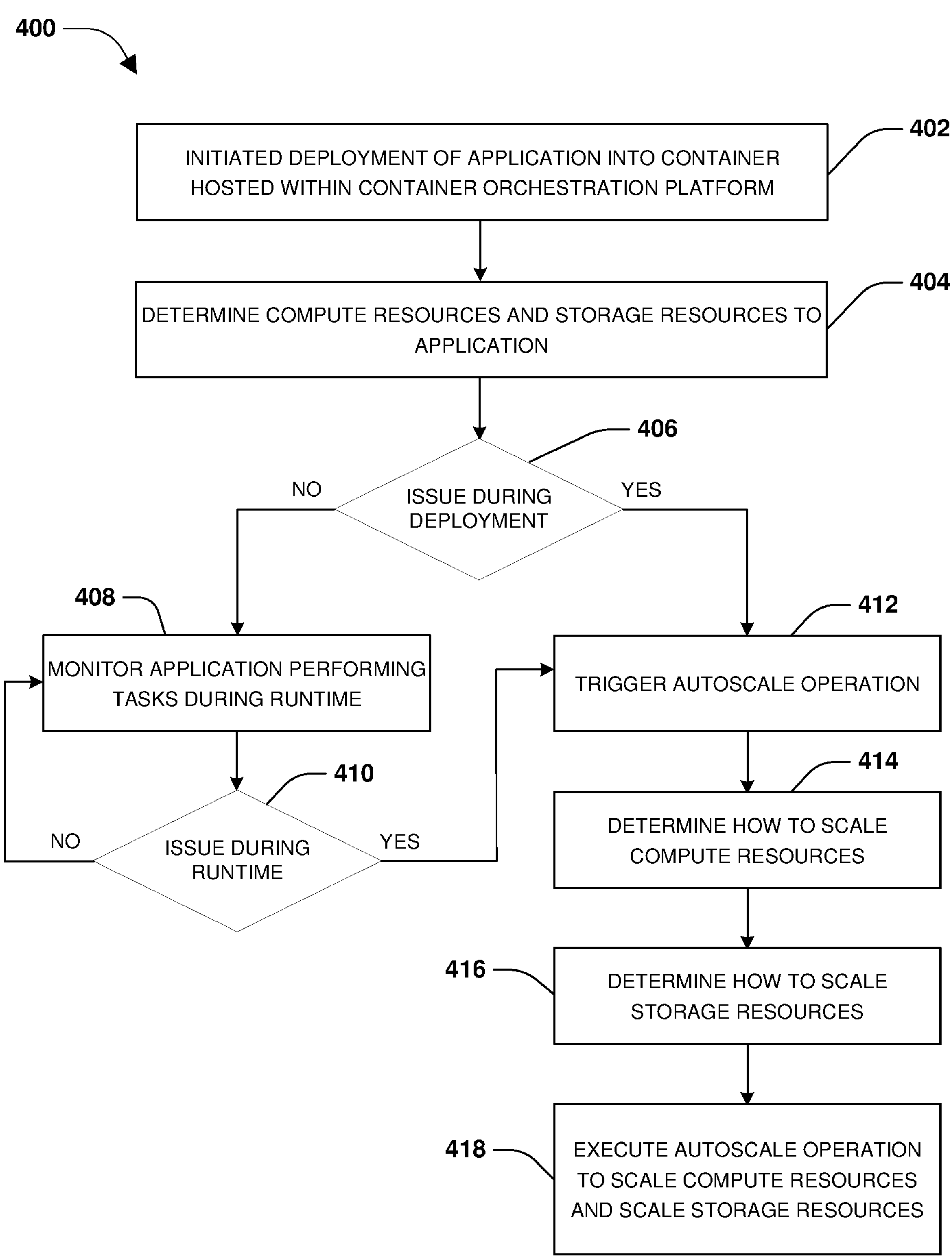
FIG. 4 is a flow chart illustrating an example of a set of operations of a method for coupled compute and storage resource autoscaling, in accordance with various embodiments of the present technology.

FIG. 4 is a flow chart illustrating an example of a set of operations of a method 400 for coupled compute and storage resource autoscaling, in accordance with various embodiments of the present technology. The coupled compute and storage resource autoscaling may be performed during deployment and/or runtime of a containerized application hosted within a container of a container orchestration platform. During operation 402 of method 400, deployment of the containerized application may be initiated. The containerized application may be defined through a container image (e.g., a configuration file) that is a ready-to-run software package containing everything needed to run the containerized application such as code and runtime required to run the containerized application, application and system libraries, and/or default values for settings. The container image may be used to deploy the containerized application within the container of the container orchestration platform. In some embodiments, the deployment may be triggered based upon an indication that the containerized application is to perform a particular task, implement a backup policy, perform a workflow of tasks, etc. The indication may correspond to a request from a client to execute a task.

As part of initiating the deployment of the containerized application, an autoscaler determines an amount of compute resources of the container orchestration platform to assign the containerized application, during operation 404 of method 400. In some embodiments, the amount of compute resources may be specified by the container image, specified by a request to perform the task, specified by a service level agreement (SLO) with the container orchestration platform for hosting the containerized application, or may be determined based upon the task to be performed and a timeframe for performing the task (e.g., the task may be performed more quickly if more compute resources are allocated). In some embodiments where a pod is used as a wrapper to manage and host the container for executing the containerized application, the amount of compute resources to assign to the containerized application are assigned to the pod for executing the containerized application through the container. The amount of compute resources to allocate to the containerized application is used by the autoscaler to determine an amount of storage resources to allocate to the containerized application from a backend storage platform (e.g., a proportional amount, an amount of storage that the compute resources will consume in order to perform the task such as a size of a backup to be created, etc.).

Before the compute resources and the storage resources are allocated, the autoscaler performs a verification as to whether storage of the backend storage platform is operational and accessible to the container orchestration platform so that the storage can be used to allocate the amount of storage resources. During operation 406 of method 400, the autoscaler determines whether there is an issue during deployment such as where the storage is not operational or not accessible to the container orchestration platform. If the storage is operational and accessible, then the storage can be used to allocate the amount of storage resources. If there is no issue, then a coupled compute and storage autoscale operation is performed to allocate the compute and storage resources to the containerized application. Once the compute and storage resources are allocated, deployment of containerized application completes and the containerized application starts execution such as to perform the task. During operation 408 of method 400, the autoscaler monitors for issues during runtime of the containerized application (e.g., failure of a task, a communication failure between the containerized application and the backend storage platform, etc.). If an issue is detected during operation 410 of method 400, then a coupled compute and storage autoscale operation is triggered to address the issue, during operation 412 of method 400. Additionally, the coupled compute and storage autoscale operation is triggered if the storage was determined during deployment to be not operational or not accessible during operation 406 of method 400.

In response to triggering the coupled compute and storage autoscale operation, the autoscaler determines how to scale the compute resources, during operation 414 of method 400. If the coupled compute and storage autoscale operation was triggered from an issue during deployment, then the compute resources may be scaled based upon the amount of compute resources that were to be assigned to the containerized application during deployment. If the coupled compute and storage autoscale operation was triggered from an issue during runtime, the compute resources may be scaled based upon compute resources needed by the containerized application to continue/restart performance of the task (e.g., the issue may have caused the task to fail, and thus compute resources were scaled down because the task was no longer being performed). During operation 416 of method 400, the autoscaler determines how to scale the storage resources. The autoscaler may identify different storage of the backend storage platform or storage of a different backend storage platform to allocate as the storage resources. Once the autoscaler has determined how to scale the compute resources of the container orchestration for allocation to the containerized application and how to scale the storage resources of a backend storage platform for allocation to the containerized application, the autoscaler executes an autoscale operation to scale the compute resources and the storage resources, during operation 418 of method 400. In this way, the containerized application is either deployed for performing the tasks, or recovers from the issue detected during runtime in order to continue performing a task that may have failed due to the issue.

Figure 5:
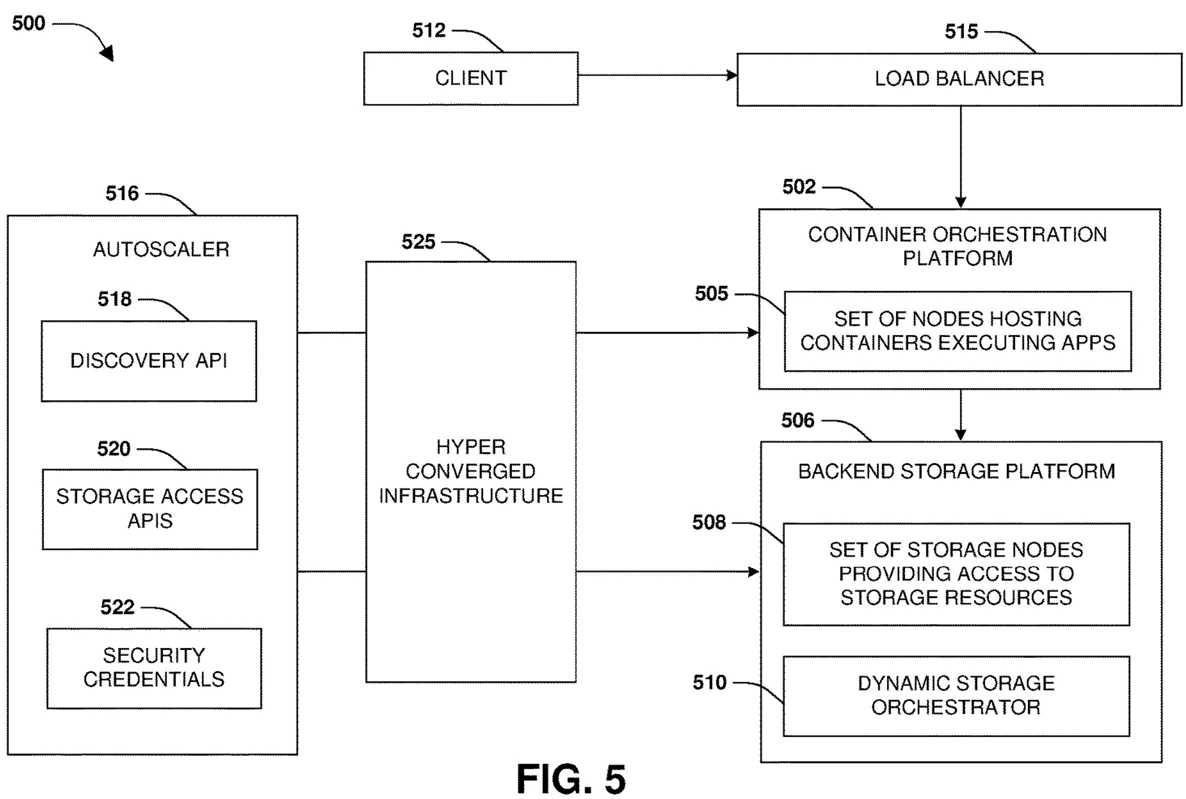
FIG. 5 is a block diagram illustrating an example of an autoscaler accessing a container orchestration platform and a backend storage platform, in accordance with an embodiment of the present technology.

FIG. 5 is a block diagram 500 illustrating an example of an autoscaler 516 accessing a container orchestration platform 502 and a backend storage platform 506, in accordance with an embodiment of the present technology. The autoscaler 516 may be configured to utilize a hyper converged infrastructure 525 (e.g., an infrastructure that virtualizes components of the container orchestration platform 502 and/or the backend storage platform 506 so that the autoscaler 516 can identify and interact with such components such as to perform realignment of resources) to identify compute resource and storage resources available to allocate to containerized applications hosted by a set of nodes 505 of the container orchestration platform 502. The hyper converged infrastructure 525 may be a software defined infrastructure that virtualizes elements of various systems (e.g., hardware defined systems) of the container orchestration platform 502 and/or the backend storage platform 506. The hyper converged infrastructure 525 may include a virtualized computing hypervisor (e.g., a hypervisor for managed virtual machines implemented as the set of nodes 505), software defined storage used to represent and/or manage storage available from the backend storage platform 506, and/or virtualized networking for communicating with the container orchestration platform 502 and/or the backend storage platform 506 through a compute region interface and storage region interface. The hyper converged infrastructure 525 may be used to discover storage endpoints of a set of storage nodes 508 of the backend storage platform 506 providing access to storage resources. The autoscaler 516 may utilize the storage region interface to invoke storage access APIs 520 for accessing the storage endpoints of the set of storage nodes 508 in order to identify available storage and/or monitor the health of the storage (e.g., whether a storage node has failed, storage managed by the storage node has failed or has degraded health, whether the storage node is accessible to the set of nodes within the container orchestration platform 502, etc.). The autoscaler 516 may utilize security credentials 522 to authenticate with the container orchestration platform 502 and/or the backend storage platform 506.

The autoscaler 516 may be configured to perform coupled compute and storage resource autoscaling for the containerized applications hosted by the set of nodes 505 of the container orchestration platform 502. The autoscaler 516 may utilize the hyper converged infrastructure 525, the compute region interface, and the security credentials 522 to access the container orchestration platform 502 for scaling compute resources allocated to the containerized applications. The autoscaler 516 may utilize the hyper converged infrastructure 525, the storage region interface, the storage access APIs 520, and the security credentials 522 to access a dynamic storage orchestrator 510 of the backend storage platform for scaling storage resources allocated to the containerized applications. The dynamic storage orchestrator 510 is configured to provide storage services to the containerized applications, and can scale up or down storage resources provided by the storage services to particular containerized applications. When the autoscaler 516 performs coupled compute and storage resource autoscaling, the autoscaler 516 notifies a load balancer 515 of the autoscaling. The load balancer 515 is configured to route client requests from clients (e.g., client 512) to the set of nodes 505 for execution of the client requests by the containerized applications. When the autoscaling results in additional nodes being used to host the containerized applications, the load balancer 515 is notified of the additional nodes to which incoming client requests can now be routed. The load balancer 515 or another load balancer may route requests from the containerized applications to the set of storage nodes 508 of the backend storage platform 506. When the autoscaling results in additional storage nodes being allocated to provide storage resources to the containerized applications, the load balancer 515 is notified of the additional storage nodes to which incoming requests from the containerized application can now be routed.

Figure 6A:
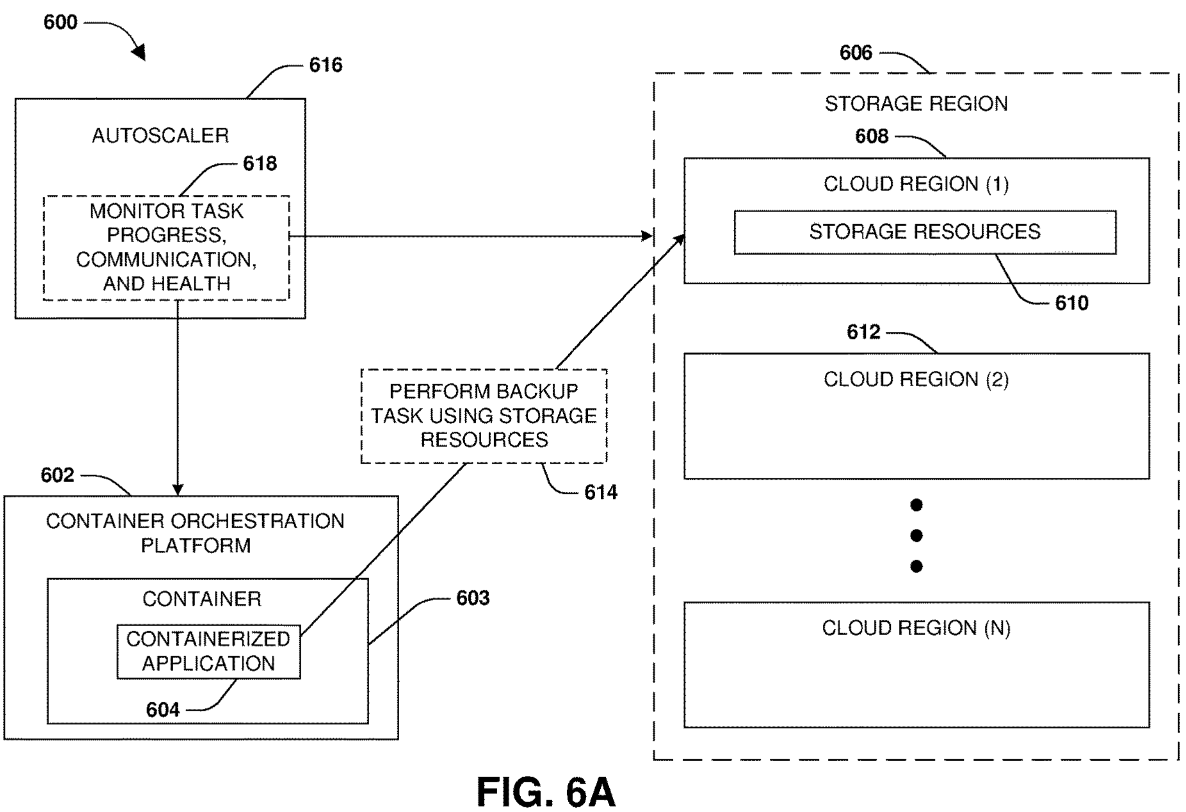
FIG. 6A is a block diagram illustrating an example of an autoscaler monitoring a containerized application accessing a storage region, in accordance with an embodiment of the present technology.

FIG. 6A is a block diagram 600 illustrating an example of an autoscaler 616 monitoring a containerized application 604 accessing a storage region 606, in accordance with an embodiment of the present technology. The storage region 606 may include a first cloud region 608 (e.g., a US East region), a second cloud region 612 (e.g., a US West region), and/or other cloud regions corresponding to backend storage platforms hosted in different geographical regions (e.g., cities, countries, continents, etc.). The cloud regions may be maintained by a single cloud storage provider or different cloud storage providers. Each cloud region may include storage hardware and/or software (e.g., routers, 5G wireless communication equipment, network switches, Wi-Fi access points, storage servers, storage racks of storage devices, storage virtual machines or storage nodes providing storage services, hard disk drives, solid state drivers, etc.). Storage resources hosted by the cloud regions may be allocated to applications. In some embodiments, storage resources 610 of the first cloud region 608 may be allocated to the containerized application 604 executing within a container 603 hosted within a container orchestration platform 602. Also, compute resources of the container orchestration platform 602 may be allocated to the containerized application 604 to perform tasks, such as a task 614 that uses the storage resources 610 (e.g., a backup task).

Figure 6B:
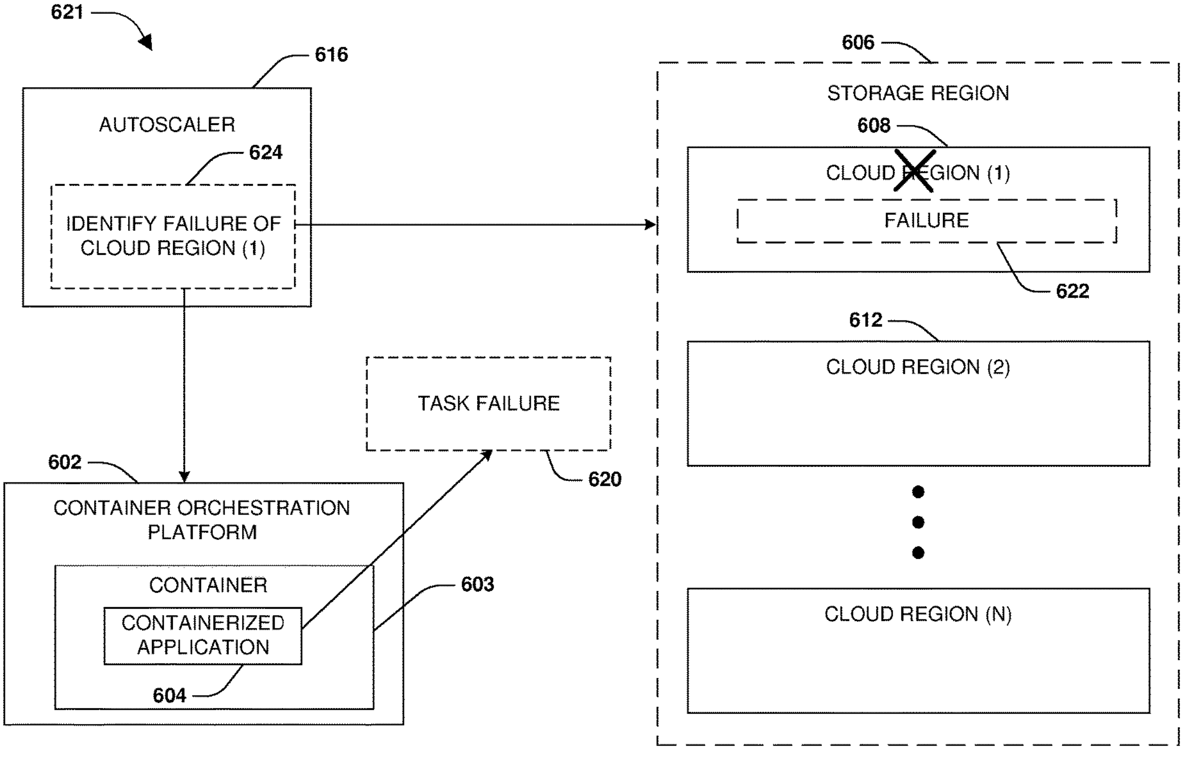
FIG. 6B is a block diagram illustrating an example of an autoscaler detecting a failure of a task being performed by a containerized application and a failure of a cloud region that was being accessed by the task, in accordance with an embodiment of the present technology.

During runtime of the containerized application 604, the autoscaler 616 may monitor 618 task process of the task 614, communication between the containerized application 604 and the first cloud region 608, and operational health of the storage resources 610, as illustrated by the block diagram 621 of FIG. 6B illustrating an example of the autoscaler 616 detecting a failure 620 of the task 614 being performed by the containerized application 604 and a failure 622 of the first cloud region 608 that was being accessed by the task 614, in accordance with an embodiment of the present technology. In some embodiments, the autoscaler 616 determine that the task 614 has failed 620. In response to the task 614 failing 620, the autoscaler 616 may attempt to communicate with the first cloud region 608 and/or access the storage resources 610. However, the autoscaler 616 may be unable to access the first cloud region 608, and thus may identify 624 the failure 622 of the first cloud region 608. Because the task 614 has failed, compute resources assigned to the containerized application 604 may be scaled down because the containerized application 604 can no longer perform the task 614.

Figure 6C:
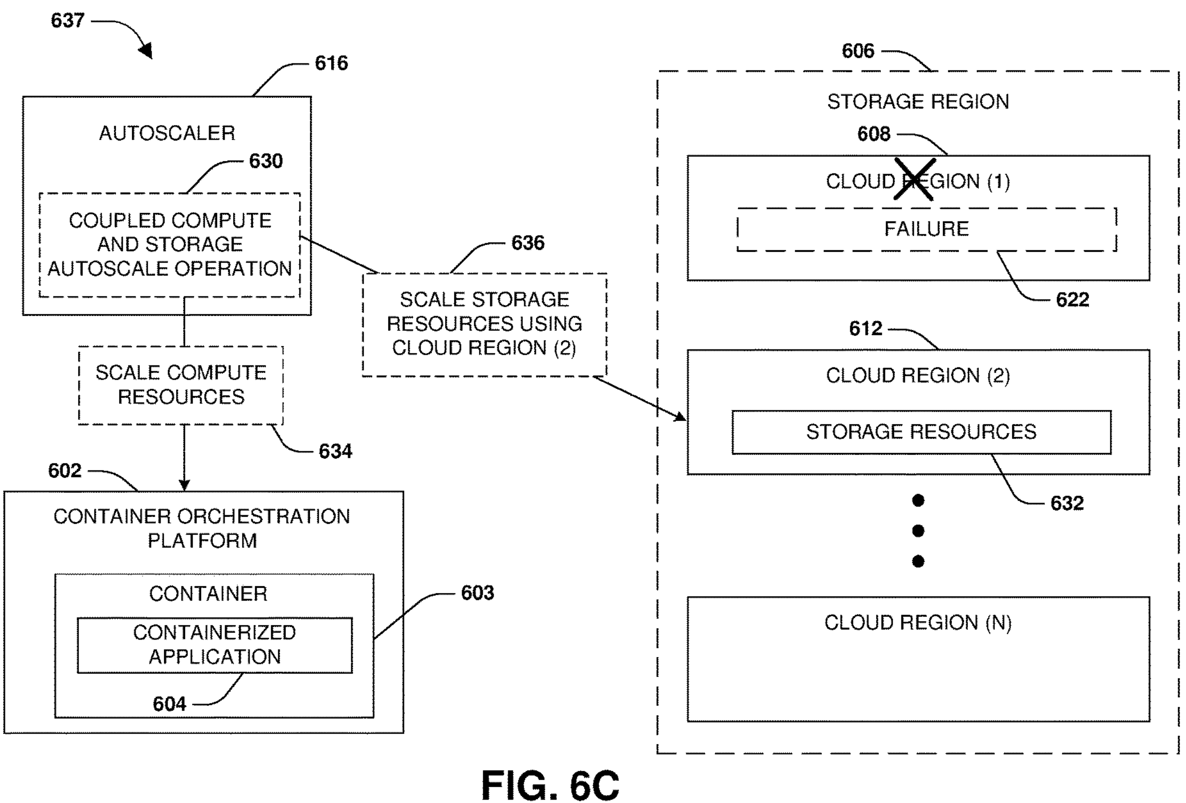
FIG. 6C is a block diagram illustrating an example of an autoscaler autoscaling compute resources and storage resources assigned to a containerized application, in accordance with an embodiment of the present technology.

At this point, the compute resources assigned to the containerized application 604 are scaled down and the storage resources 610 are no longer accessible to the containerized application 604. Accordingly, the autoscaler 616 triggers a coupled compute and storage autoscale operation 630 to scale 634 compute resources allocated to the containerized application 604 and scale 636 storage resources 632 allocated to the containerized application 604 for restarting or resuming performance of the task 614, as illustrated by block diagram 637 of FIG. 6C illustrating an example of the autoscaler 616 autoscaling compute resources and storage resources assigned to the containerized application 604, in accordance with an embodiment of the present technology. The coupled compute and storage autoscale operation 630 may determine an amount of compute resources to allocate to the containerized application 604, which may be based upon an amount of processor, memory, and/or other compute resources that will be needed to resume and complete operation of the task 614 or to restart the task 614 from the start. The coupled compute and storage autoscale operation 630 may determine an amount of storage resources to allocate to the containerized application 604 based upon the amount of compute resources (e.g., an amount of storage that will be consumed by the amount of compute resources performing the task 614). The coupled compute and storage autoscale operation 630 may identify the second cloud region 612 as having available storage resources that can be allocated to the containerized application 604. In this way, the compute resources are allocated to the containerized application 604 and storage resources 632 of the second cloud region 612 are allocated to the containerized application 604.

Figure 7:
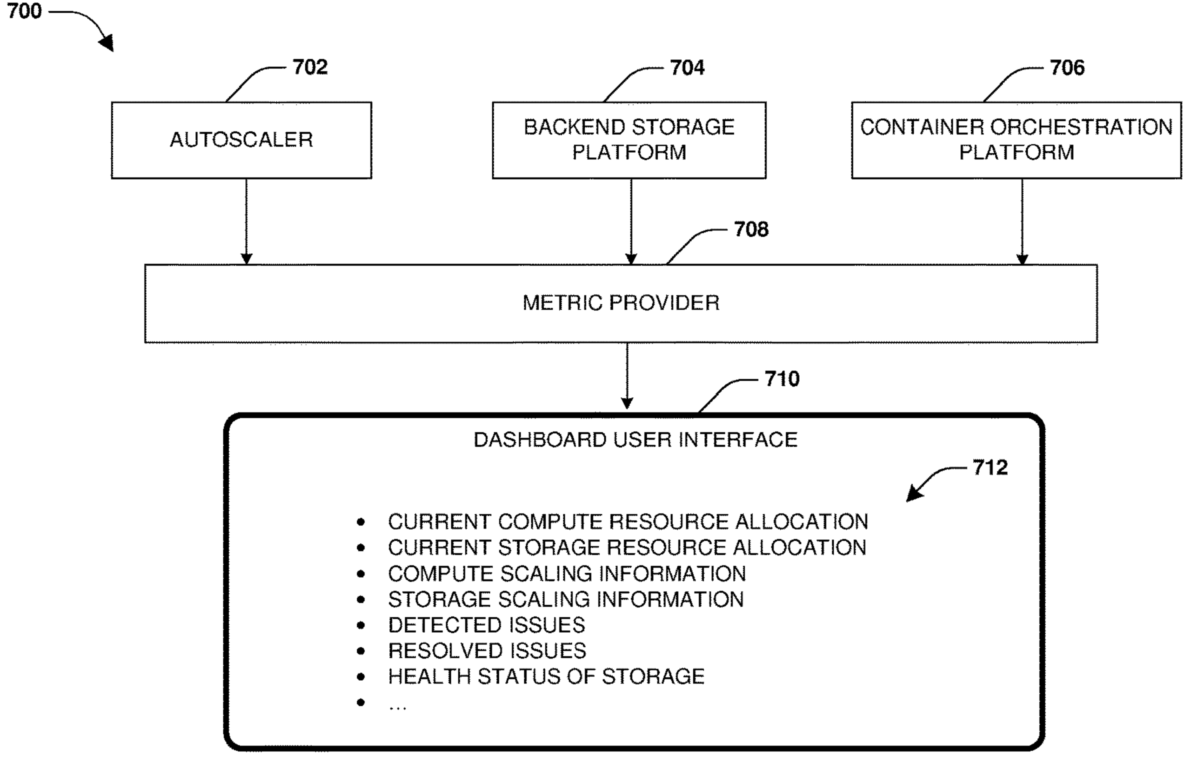
FIG. 7 is a block diagram illustrating an example of a dashboard user interface, in accordance with an embodiment of the present technology.

FIG. 7 is a block diagram 700 illustrating an example of a dashboard user interface 710, in accordance with an embodiment of the present technology. An autoscaler 702 may be configured to perform coupled compute and storage autoscale operations to scale compute resources assigned by a container orchestration platform 706 to containerized applications and scale storage resources assigned by a backend storage platform 704 to the containerized applications. A metric provider 708 may be configured to retrieve information from the autoscaler 702, the backend storage platform 704, and/or the container orchestration platform 706. The information 712 may relate to an operational status of a containerized application, task progress of tasks being performed by the containerized application (e.g., a backup task may be 47% complete), a current amount of compute resources allocated to the containerized application, and/or other information reported by the container orchestration platform 706. The information 712 may relate to a current amount of storage resources allocated to the containerized application and/or other information reported by the backend storage platform 704. The information 712 may relate to compute resource scaling information (e.g., how much compute resources were scaled up/down, a reason for the compute resource scaling, a day/time of performing the compute resource scaling, etc.), storage resource scaling information (e.g., how much storage resources were scaled up/down, a reason for the storage resource scaling, a day/time of performing the storage resource scaling, etc.), issued detected by the autoscaler 702 (e.g., failed storage, storage with degraded performance, a failed backend storage platforms, network connectivity failures, etc.), how the issues were resolved (e.g., a failed storage device within a first cloud region was replaced with different storage within a second cloud region), health status of storage resources, and/or other information reported by the autoscaler 702.

The metric provider 708 may periodically retrieve the information 712 or on demand in response to a request for the information 712. The metric provider 708 may construct a dashboard user interface 710 that may be provided to clients for display through computing devices. The dashboard user interface 710 may provide the information 712 collected by the metric provider 708. In some embodiments, the information 712 may be formatted for display, such as where compute and storage resource allocations over time may be displayed through a chart, graph, etc. The dashboard user interface 710 may provide cost information associated with compute and storage resources so that a client can make informed decisions on how to subscribe to compute and storage resources (e.g., how much is the client paying for failed storage or storage operating in a degraded state).

Figure 8:
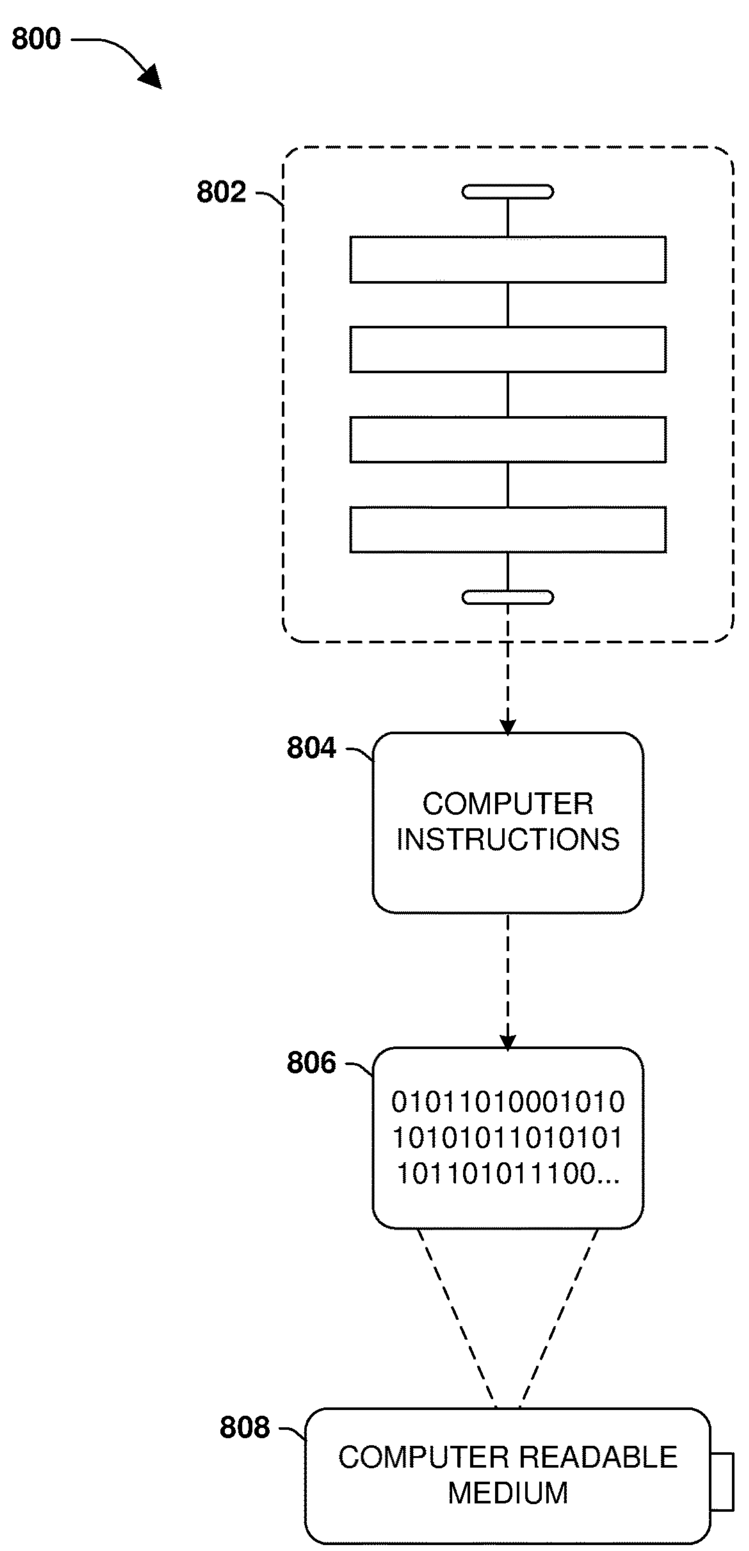
FIG. 8 is an example of a computer readable medium in which various embodiments of the present technology may be implemented.

FIG. 8 is an example of a computer readable medium 800 in which various embodiments of the present technology may be implemented. An example embodiment of a computer-readable medium or a computer-readable device that is devised in these ways is illustrated in FIG. 8, wherein the implementation comprises a computer-readable medium 808, such as a compact disc-recordable (CD-R), a digital versatile disc-recordable (DVD-R), flash drive, a platter of a hard disk drive, etc., on which is encoded computer-readable data 806. The computer-readable data 806, such as binary data comprising at least one of a zero or a one, in turn comprises processor-executable computer instructions 804 configured to operate according to one or more of the principles set forth herein. In some embodiments, the processor-executable computer instructions 804 are configured to perform at least some of the exemplary methods 802 disclosed herein, such as method of FIG. 4, for example. In some embodiments, the processor-executable computer instructions 804 are configured to implement a system, such as at least some of the exemplary systems disclosed herein, such as system of FIGS. 2A-2D, system of FIG. 5, system 600 of FIGS. 6A-6C, and/or system of FIG. 6, for example. Many such computer-readable media are contemplated to operate in accordance with the techniques presented herein.

In some embodiments, the described methods and/or their equivalents may be implemented with computer executable instructions. Thus, in some embodiments, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on. In some embodiments, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, magnetic tape, optical or non-optical data storage devices and/or any other medium which can be used to store data.

Some examples of the claimed subject matter have been described with reference to the drawings, where like reference numerals are generally used to refer to like elements throughout. In the description, for purposes of explanation, numerous specific details are set forth in order to provide an understanding of the claimed subject matter. It may be evident, however, that the claimed subject matter may be practiced without these specific details. Nothing in this detailed description is admitted as prior art.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A system, comprising:

a compute region interface providing access to a compute allocator of a container orchestration platform hosted within a compute region separate from both a first storage region and a second storage region;

a storage region interface providing access to storage application programming interfaces (APIs) of the first storage region and the second storage region; and an autoscaler providing coupled compute and storage scaling for a containerized application within the container orchestration platform by:

determining, based upon a task assigned to the containerized application, a determined amount of compute resources to allocate from the compute region to the containerized application within the container orchestration platform;

calculating, based upon the task and using the determined amount of compute resources, a calculated amount of storage resources to allocate to the containerized application;

triggering, using the storage region interface, a verification that the first storage region has first operational storage to allocate as the calculated amount of storage resources;

in response to the verification succeeding, executing a coupled compute and storage autoscale operation to control the compute allocator to allocate the determined amount of compute resources and the storage region interface to allocate, using the storage APIs, the calculated amount of storage resources from the first storage region for the containerized application;

in response to the verification failing, performing a self-healing operation to repair storage resources of the first storage region; and in response to the self-healing operation failing to repair the storage resources:

evaluating the second storage region to identify second operational storage to allocate as the calculated amount of storage resources; and executing the coupled compute and storage autoscale operation to control the compute allocator to allocate the determined amount of compute resources and the storage region interface to allocate, using the storage APIs, the calculated amount of storage resources from the second storage region for the containerized application.

2. The system of claim 1, wherein the autoscaler:

utilizes the storage region interface to perform a health verification to determine whether first storage of the first storage region is operational for allocation as the first operational storage to the containerized application;

in response to the health verification indicating that the first storage is not operational, utilizes the storage region interface to identify a backend storage platform of the second storage region with second storage that is operational for allocation; and in response to verifying that the second storage is operational and accessible to the compute region, triggers execution of the coupled compute and storage autoscale operation to:

utilize the compute region interface to instruct the compute allocator to allocate the determined amount of compute resources from the compute region to the containerized application; and trigger the storage region interface to instruct the backend storage platform to allocate the calculated amount of storage resources to the containerized application using the second storage.

3. The system of claim 1, wherein the calculated amount of storage resources are allocated from the first storage region hosted by a first backend storage platform, and wherein the autoscaler:

utilizes the storage region interface to transmit a health checkup request, during execution of the containerized application, to the first backend storage platform to identify a health status of the first operational storage; and in response to the health status indicating a warning for the first operational storage, triggers execution of the coupled compute and storage autoscale operation for the containerized application by allocating the calculated amount of storage resources from the second operational storage to the containerized application, wherein the calculated amount of storage resources from the first storage region are deallocated from the containerized application.

4. The system of claim 1, wherein the calculated amount of storage resources are allocated from the first storage region hosted by a first backend storage platform within a first cloud storage region, and wherein the autoscaler:

in response to determining that the first backend storage platform of the first cloud storage region is experience a failure where the containerized application cannot access the first storage region, triggers execution of the coupled compute and storage autoscale operation using the second storage region hosted by a second backend storage platform within a second cloud storage region.

5. The system of claim 1, wherein the calculated amount of storage resources are allocated from the first storage region hosted by a first backend storage platform, and wherein the autoscaler:

monitors progress of the task being executed by the containerized application and communication between the containerized application and the first storage region; and in response to identifying at least one of a failure of the task or a communication issue where the containerized application is unable to access the first storage region, triggers execution of the coupled compute and storage autoscale operation to allocate the calculated amount of storage resources from the second operational storage to the containerized application.

6. The system of claim 1, wherein the autoscaler:

accesses security credentials associated with the containerized application and the container orchestration platform;

utilizes the security credentials to authenticate with the container orchestration platform for executing the coupled compute and storage autoscale operation to instruct the compute allocator to allocate the determined amount of compute resources from the compute region to the containerized application; and utilizes the security credentials to authenticate with a backend storage platform to instruct the backend storage platform to allocate the calculated amount of storage resources from the first region for access by the containerized application.

7. The system of claim 1, wherein the autoscaler:

executes the coupled compute and storage autoscale operation to instruct a backend storage platform to add one or more storage nodes to the first storage region according to a random assignment for allocating the calculated amount of storage resources to the containerized application, wherein the one or more storage nodes are hosted within a cloud computing environment implementing the backend storage platform; and executes the coupled compute and storage autoscale operation to instruct the compute allocator to assign one or more compute nodes as the determined amount of compute resources allocated to the containerized application.

8. The system of claim 1, wherein the autoscaler:

evaluates a request, for the containerized application to perform the task, to determine the determined amount of compute resources to be allocated to the containerized application for performing the task.

9. The system of claim 1, wherein the autoscaler:

evaluates a request, for the containerized application to perform the task, to determine the determined amount of compute resources to be allocated to the containerized application for performing the task; and calculates the calculated amount of storage resources to allocate to the containerized application based upon an amount of storage that the task will utilize.

10. The system of claim 1, wherein the autoscaler:

evaluates a backup policy, to be implemented by the containerized application, to identify a frequency of creating backups; and determines the determined amount of compute resources and calculates the calculated amount of storage resources to allocate for creating and storing the backups according to the frequency specified by the backup policy.

11. The system of claim 1, wherein the autoscaler:

evaluates a restore operation, to be implemented by the containerized application for restoring data using a snapshot, to determine the amount of determined compute resources and calculate the calculated amount of storage resources to be allocated to the containerized application for implementing the restore operation.

12. The system of claim 1, wherein the autoscaler:

calculates the amount of calculated storage resources based upon an amount of storage that can be utilized by the determined amount of compute resources.

13. The system of claim 2, wherein the autoscaler:

in response to identifying a version mismatch between a version of the container orchestration platform and a version of a first backend storage platform hosting the first storage region, triggers execution of the coupled compute and storage autoscale operation to autoscale the calculated amount of storage resources from the second storage region hosted by a second backend storage platform matching the version of the container orchestration platform.

14. The system of claim 1, wherein the autoscaler:

scales the compute resources and the storage resources together during deployment and before operation of the containerized application, wherein the calculated amount of storage resources is calculated based upon an amount of inoperable storage detected by the verification.

15. The system of claim 14, wherein the autoscaler:

calculates the calculated amount of storage resources to allocate to the containerized application based upon an amount of storage that the compute resources will utilize to store data associated with the task assigned to the containerized application to perform.

16. The system of claim 1, wherein the autoscaler:

evaluates a backup policy to be implemented by the containerized application to identify an amount of data to backup; and determines the determined amount of compute resources and calculates the calculated amount of storage resources to allocate for creating and storing backups that include the amount of data identified from the backup policy.

17. A method, comprising:

determining, based upon a task assigned to a containerized application, a determined amount of compute resources to allocate from a compute region to the containerized application within a container orchestration platform, wherein the compute region is hosted separate from both a first storage region and a second storage region;

calculating, based upon the task and using the determined amount of compute resources, a calculated amount of storage resources to allocate to the containerized application;

triggering, using a storage region interface, a verification that the first storage region has first operational storage to allocate as the calculated amount of storage resources;

in response to the verification succeeding, executing a coupled compute and storage autoscale operation to control a compute allocator to allocate the determined amount of compute resources and the storage region interface to allocate, using a first storage application programming interface (API) of the first storage region, the calculated amount of storage resources from the first storage region for the containerized application;

in response to the verification failing, performing a self-healing operation to repair storage resources of the first storage region; and in response to the self-healing operation failing to repair the storage resources: evaluating the second storage region to identify second operational storage to allocate as the calculated amount of storage resources; and executing the coupled compute and storage autoscale operation to control the compute allocator to allocate the determined amount of compute resources and the storage region interface to allocate, using a second storage API of the second storage region, the calculated amount of storage resources from the second storage region for the containerized application.

18. The method of claim 17, comprising:

evaluating a configuration file for the containerized application to identify determine the determined amount of compute resources to allocate to the containerized application; and evaluating a workload to be performed by the containerized application using the determined amount of compute resources in order to calculate the calculated amount of storage resources to allocate to the containerized application.

19. A non-transitory machine readable medium comprising instructions, which when executed by a machine, causes the machine to:

determine, based upon a task assigned to a containerized application, a determined amount of compute resources to allocate from a compute region to the containerized application within a container orchestration platform, wherein the compute region is hosted separate from both a first storage region and a second storage region;

calculate, based upon the task and using the determined amount of compute resources, a calculated amount of storage resources to allocate to the containerized application;

trigger, using a storage region interface, a verification that the first storage region has first operational storage to allocate as the calculated amount of storage resources;

in response to the verification succeeding, execute a coupled compute and storage autoscale operation to control a compute allocator to allocate the determined amount of compute resources and the storage region interface to allocate, using a first storage application programming interface (API) of the first storage region, the calculated amount of storage resources from the first storage region for the containerized application;

in response to the verification failing, perform a self-healing operation to repair storage resources of the first storage region; and in response to the self-healing operation failing to repair the storage resources:

evaluate the second storage region to identify second operational storage to allocate as the calculated amount of storage resources; and execute the coupled compute and storage autoscale operation to control the compute allocator to allocate the determined amount of compute resources and the storage region interface to allocate, using a second storage API of the second storage region, the calculated amount of storage resources from the second storage region for the containerized application.

20. The non-transitory machine readable medium of claim 19, wherein the instructions cause the machine to:

notify a load balancer of one or more storage nodes added to a backend storage platform for hosting the calculated amount of storage resources allocated to the containerized application, wherein the load balancer routes storage access requests from the containerized application to the one or more storage nodes.

* * * * *